United States Patent
Yamamoto

(10) Patent No.: US 11,514,598 B2
(45) Date of Patent: Nov. 29, 2022

(54) IMAGE PROCESSING APPARATUS, IMAGE PROCESSING METHOD, AND MOBILE DEVICE

(71) Applicant: SONY CORPORATION, Tokyo (JP)

(72) Inventor: Keitaro Yamamoto, Tokyo (JP)

(73) Assignee: SONY CORPORATION, Minato-ku (JP)

( * ) Notice: Subject to any disclaimer, the term of this patent is extended or adjusted under 35 U.S.C. 154(b) by 31 days.

(21) Appl. No.: 17/250,272

(22) PCT Filed: Jun. 14, 2019

(86) PCT No.: PCT/JP2019/023690
§ 371 (c)(1),
(2) Date: Dec. 23, 2020

(87) PCT Pub. No.: WO2020/004074
PCT Pub. Date: Jan. 2, 2020

(65) Prior Publication Data
US 2021/0209783 A1      Jul. 8, 2021

(30) Foreign Application Priority Data
Jun. 29, 2018  (JP) .............................. JP2018-124840

(51) Int. Cl.
*H04N 9/04*       (2006.01)
*G06T 7/593*      (2017.01)
(Continued)

(52) U.S. Cl.
CPC ........... *G06T 7/593* (2017.01); *H04N 5/2355* (2013.01); *H04N 13/243* (2018.05); *H04N 2013/0081* (2013.01)

(58) Field of Classification Search
CPC .... G06T 7/593; H04N 13/243; H04N 5/2355; H04N 2013/0081; H04N 9/04
See application file for complete search history.

(56) References Cited

U.S. PATENT DOCUMENTS

2014/0184894 A1*  7/2014  Motta ................. H04N 5/2353
                                                                   348/362
2014/0232830 A1   8/2014  Ichige
(Continued)

FOREIGN PATENT DOCUMENTS

CN       108702437 A    10/2018
DE    112012004352 T5     7/2014
(Continued)

OTHER PUBLICATIONS

International Search Report and Written Opinion of PCT Application No. PCT/JP2019/023690, dated Aug. 6, 2019, 9 pages of ISRWO.

*Primary Examiner* — Patrick E Demosky
(74) *Attorney, Agent, or Firm* — Chip Law Group

(57) ABSTRACT

Provided is an image processing apparatus that includes a long-time exposure distance image generation unit that captures an image with long-time exposure, calculates a parallax from a first long-time exposure image and a second long-time exposure image from a first long-time exposure camera and a second long-time exposure camera disposed at a predetermined interval, and generates a long-time exposure distance image. The image processing apparatus further includes a short-time exposure distance image generation unit that captures an image with short-time exposure, calculates a parallax from a first short-time exposure image and a second short-time exposure image from a first short-time exposure camera and a second short-time exposure camera disposed at a predetermined interval, and generates a short-time exposure distance image, and a distance image generation unit that combines the long-time exposure distance image with the short-time exposure distance image to generate a distance image.

16 Claims, 16 Drawing Sheets

(51) Int. Cl.
*H04N 13/243* (2018.01)
*H04N 5/235* (2006.01)
*H04N 13/00* (2018.01)

(56) References Cited

U.S. PATENT DOCUMENTS

2017/0289515 A1 10/2017 Li et al.
2019/0294899 A1* 9/2019 Okubo ................ G06T 5/50

FOREIGN PATENT DOCUMENTS

| | | |
|---|---|---|
| EP | 3483832 A1 | 5/2019 |
| JP | 2007-096684 A | 4/2007 |
| JP | 2013-088587 A | 5/2013 |
| JP | 2018-005682 A | 1/2018 |
| WO | 2013/058085 A1 | 4/2013 |
| WO | 2017/172083 A1 | 10/2017 |
| WO | 2018/008461 A1 | 1/2018 |

\* cited by examiner

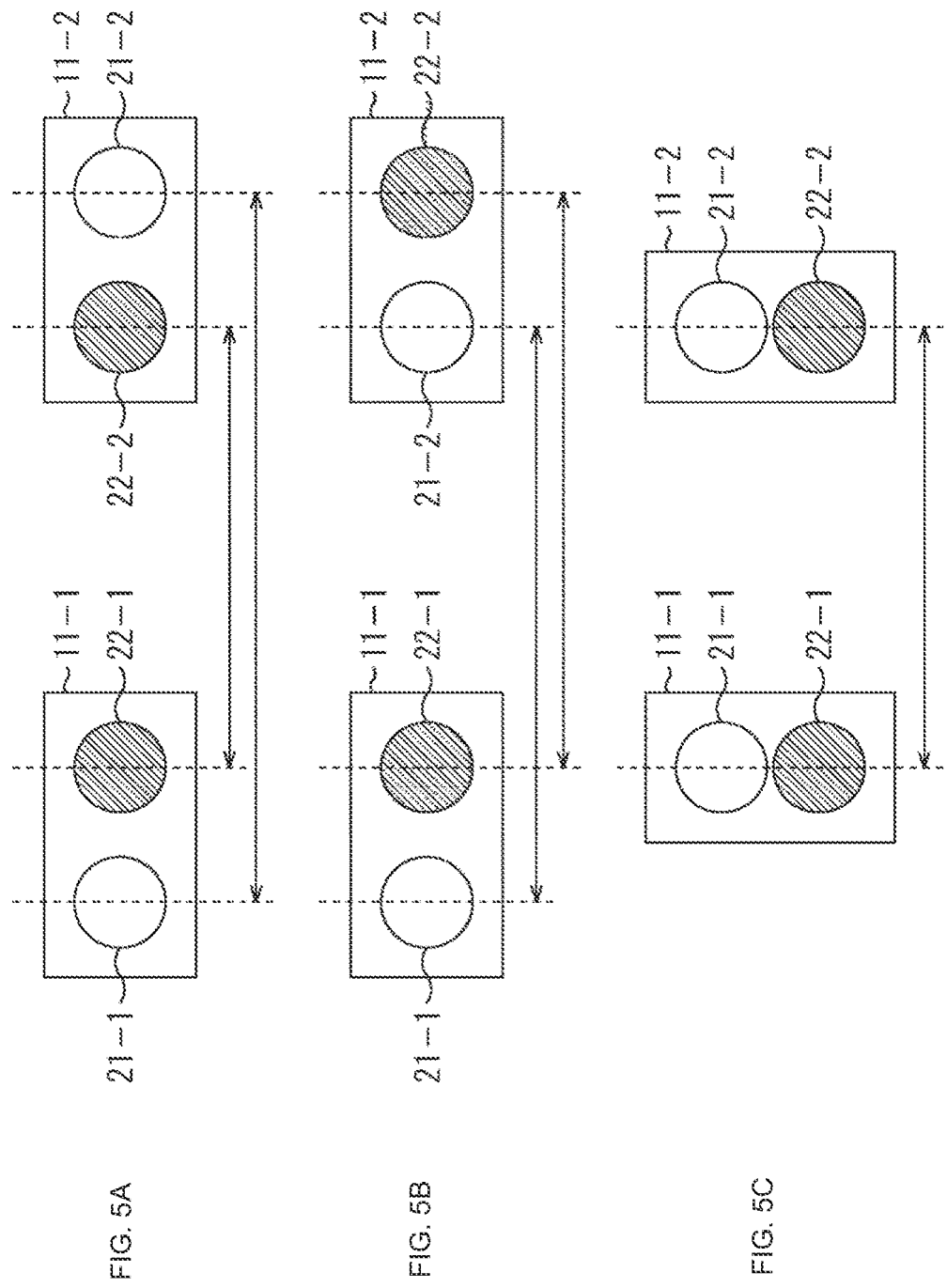

IMAGE PROCESSING APPARATUS, IMAGE PROCESSING METHOD, AND MOBILE DEVICE

CROSS REFERENCE TO RELATED APPLICATIONS

This application is a U.S. National Phase of International Patent Application No. PCT/JP2019/023690 filed on Jun. 14, 2019, which claims priority benefit of Japanese Patent Application No. JP 2018-124840 filed in the Japan Patent Office on Jun. 29, 2018. Each of the above-referenced applications is hereby incorporated herein by reference in its entirety.

TECHNICAL FIELD

The present technology relates to an image processing apparatus, an image processing method, a mobile device, and a program, and to, for example, an image processing apparatus, an image processing method, a mobile device, and a program that enable more accurate distance measurement when distance measurement is performed using captured images.

BACKGROUND ART

In recent years, detection of obstacles such as pedestrians or vehicles using a plurality of cameras such as a stereo camera has been put into practical use. A stereo camera is an apparatus that calculates a positional deviation (parallax) of the same object in a plurality of images captured at the same time, and calculates a position of the object in a real space on the basis of the calculated parallax. This stereo camera calculates a distance to an object using a pair of images captured by two left and right imaging elements, and performs recognition of the object.

PTL 1 proposes acquiring a first image and a second image having different exposure times, performing brightness correction on the first image or the second image that has been acquired, and calculating a parallax using the corrected image.

CITATION LIST

Patent Literature

PTL 1: JP 2013-88587A

SUMMARY

Technical Problem

According to PTL 1, because brightness correction is performed on an acquired image, brightness cannot be correctly corrected, for example, in a region in which a pixel value is saturated or blackened, and as a result, a parallax is likely to be unable to be calculated correctly. Further, it is necessary for appropriate imaging to be performed so that imaging in which saturation or blackening occurs is not performed. For example, in a scene with intense light and darkness, it is difficult for imaging in which no saturation or blackening occurs to be performed, the saturation or blackening is highly likely to occur in a region of a part of an image, and a correct parallax is likely to be unable to be calculated.

It is preferable for a correct parallax to be able to be calculated irrespective of a scene, in other words, for a distance to an object to be able to be measured with high accuracy.

The present technology has been made in view of such circumstances, and enables a distance to an object to be measured with high accuracy.

Solution to Problem

A first image processing apparatus according to an aspect of the present technology includes: a long-time exposure distance image generation unit configured to capture an image with long-time exposure, calculate a parallax from a first long-time exposure image and a second long-time exposure image from a first long-time exposure camera and a second long-time exposure camera disposed at a predetermined interval, and generate a long-time exposure distance image; a short-time exposure distance image generation unit configured to capture an image with short-time exposure, calculate a parallax from a first short-time exposure image and a second short-time exposure image from a first short-time exposure camera and a second short-time exposure camera disposed at a predetermined interval, and generate a short-time exposure distance image; and a distance image generation unit configured to combine the long-time exposure distance image with the short-time exposure distance image to generate a distance image.

A first image processing method according to an aspect of the present technology includes: by an image processing apparatus, capturing an image with long-time exposure; calculating a parallax from a first long-time exposure image and a second long-time exposure image from a first long-time exposure camera and a second long-time exposure camera disposed at a predetermined interval; generating a long-time exposure distance image; capturing an image with short-time exposure; calculating a parallax from a first short-time exposure image and a second short-time exposure image from a first short-time exposure camera and a second short-time exposure camera disposed at a predetermined interval; generating a short-time exposure distance image; and combining the long-time exposure distance image with the short-time exposure distance image to generate a distance image.

A first program according to an aspect of the present technology causes a computer to execute a process of capturing an image with long-time exposure, calculating a parallax from a first long-time exposure image and a second long-time exposure image from a first long-time exposure camera and a second long-time exposure camera disposed at a predetermined interval, generating a long-time exposure distance image, capturing an image with short-time exposure, calculating a parallax from a first short-time exposure image and a second short-time exposure image from a first short-time exposure camera and a second short-time exposure camera disposed at a predetermined interval, generating a short-time exposure distance image; and combining the long-time exposure distance image with the short-time exposure distance image to generate a distance image.

A first mobile device according to an aspect of the present technology includes: a first long-time exposure camera and a second long-time exposure camera configured to capture an image with long-time exposure and disposed at a predetermined interval; a first short-time exposure camera and a second short-time exposure camera configured to capture an image with short-time exposure and disposed at a predetermined interval; a long-time exposure distance image generation unit configured to calculate a parallax from a first long-time exposure image from the first long-time exposure camera and a second long-time exposure image from the second long-time exposure camera and generate a long-time exposure distance image; a short-time exposure distance image generation unit configured to calculate a parallax from a first short-time exposure image from the first short-time exposure camera and a second short-time exposure image from the second short-time exposure camera and generate a short-time exposure distance image; and a distance image generation unit configured to combine the long-time exposure distance image with the short-time exposure distance image to generate a distance image.

A second image processing apparatus according to an aspect of the present technology includes: a first image generation unit configured to combine a first long-time exposure image from a first long-time exposure camera that captures an image with long-time exposure with a first short-time exposure image from a first short-time exposure camera that captures an image with short-time exposure to generate a first image with a wide dynamic range; a second image generation unit configured to combine a second long-time exposure image from a second long-time exposure camera disposed at a position separated a predetermined distance from the first long-time exposure camera and capturing an image with long-time exposure with a second short-time exposure image from a second short-time exposure camera disposed at a position separated a predetermined distance from the first short-time exposure camera and capturing an image with short-time exposure to generate a second image with a wide dynamic range; a reference distance image generation unit configured to calculate a parallax from the first image and the second image to generate a reference distance image serving as a reference; a long-time exposure distance image generation unit configured to calculate a parallax from the first long-time exposure image and the second long-time exposure image to generate a long-time exposure distance image; and a distance image generation unit configured to combine the reference distance image with the long-time exposure distance image to generate a distance image.

A second image processing method according to an aspect of the present technology includes: by an image processing apparatus, combining a first long-time exposure image from a first long-time exposure camera that captures an image with long-time exposure with a first short-time exposure image from a first short-time exposure camera that captures an image with short-time exposure to generate a first image with a wide dynamic range; combining a second long-time exposure image from a second long-time exposure camera disposed at a position separated a predetermined distance from the first long-time exposure camera and capturing an image with long-time exposure with a second short-time exposure image from a second short-time exposure camera disposed at a position separated a predetermined distance from the first short-time exposure camera and capturing an image with short-time exposure to generate a second image with a wide dynamic range; calculating a parallax from the first image and the second image to generate a reference distance image serving as a reference; calculating a parallax from the first long-time exposure image and the second long-time exposure image to generate a long-time exposure distance image; and combining the reference distance image with the long-time exposure distance image to generate a distance image.

A second program according to an aspect of the present technology causes a computer to execute a process of combining a first long-time exposure image from a first long-time exposure camera that captures an image with long-time exposure with a first short-time exposure image from a first short-time exposure camera that captures an image with short-time exposure to generate a first image with a wide dynamic range, combining a second long-time exposure image from a second long-time exposure camera disposed at a position separated a predetermined distance from the first long-time exposure camera and capturing an image with long-time exposure with a second short-time exposure image from a second short-time exposure camera disposed at a position separated a predetermined distance from the first short-time exposure camera and capturing an image with short-time exposure to generate a second image with a wide dynamic range, calculating a parallax from the first image and the second image to generate a reference distance image serving as a reference, calculating a parallax from the first long-time exposure image and the second long-time exposure image to generate a long-time exposure distance image, and combining the reference distance image with the long-time exposure distance image to generate a distance image.

A second mobile device according to an aspect of the present technology includes: a first long-time exposure camera and a second long-time exposure camera configured to capture an image with long-time exposure and disposed at a predetermined interval; a first short-time exposure camera and a second short-time exposure camera configured to capture an image with short-time exposure and disposed at a predetermined interval; a first image generation unit configured to combine a first long-time exposure image from the first long-time exposure camera with a first short-time exposure image from the first short-time exposure camera to generate a first image with a wide dynamic range; a second image generation unit configured to combine a second long-time exposure image from the second long-time exposure camera with a second short-time exposure image from the second short-time exposure camera to generate a second image with a wide dynamic range; a reference distance image generation unit configured to calculate a parallax from the first image and the second image to generate a reference distance image serving as a reference; a long-time exposure distance image generation unit configured to calculate a parallax from the first long-time exposure image and the second long-time exposure image to generate a long-time exposure distance image; and a distance image generation unit configured to combine the reference distance image with the long-time exposure distance image to generate a distance image.

In the first image processing apparatus, image processing method, program, and mobile device according to the aspect of the present technology, the image is captured with long-time exposure, the parallax is calculated from the first long-time exposure image and the second long-time exposure image from the first long-time exposure camera and the second long-time exposure camera disposed at the predetermined interval, the long-time exposure distance image is generated, the image is captured with short-time exposure, the parallax is calculated from the first short-time exposure image and the second short-time exposure image from the first short-time exposure camera and the second short-time exposure camera disposed at the predetermined interval, the short-time exposure distance image is generated, and the long-time exposure distance image is combined with the short-time exposure distance image so that the distance image is generated.

In the second image processing apparatus, image processing method, program, and mobile device according to the aspect of the present technology, the first long-time exposure image from the first long-time exposure camera that captures an image with long-time exposure is combined with the first short-time exposure image from the first short-time exposure camera that captures an image with short-time exposure so that the first image with a wide dynamic range is generated, the second long-time exposure image from the second long-time exposure camera disposed at the position separated the predetermined distance from the first long-time exposure camera and capturing an image with long-time exposure is combined with the second short-time exposure image from the second short-time exposure camera disposed at the position separated the predetermined distance from the first short-time exposure camera and capturing an image with short-time exposure so that the second image with a wide dynamic range is generated, the parallax is calculated from the first image and the second image so that the reference distance image serving as a reference is generated, the parallax is calculated from the first long-time exposure image and the second long-time exposure image so that the long-time exposure distance image is generated, and the reference distance image is combined with the long-time exposure distance image so that the distance image is generated.

The image processing apparatus and the mobile device may be independent apparatuses or internal blocks constituting one apparatus. Further, the mobile device may be an independent apparatus or an internal block constituting one apparatus.

Further, the program can be provided by being transmitted via a transmission medium or by being recorded on a recording medium.

Advantageous Effects of Invention

According to an aspect of the present technology, it is possible to measure the distance to the object with high accuracy.

The effects described here are not necessarily limiting, and any effects described in the present disclosure may be obtained.

BRIEF DESCRIPTION OF DRAWINGS

FIGS. 5A, 5B, and 5C are diagrams illustrating a disposition of cameras.

DESCRIPTION OF EMBODIMENTS

Hereinafter, modes for carrying out the present technology (hereinafter referred to as embodiments) will be described.

The present technology can be applied to a measurement apparatus that measures a distance between the measurement apparatus and a predetermined object. Further, the measurement of the distance in the embodiment to be described below is performed by capturing an image and analyzing the captured image. Hereinafter, a case in which the present technology is applied to an image processing apparatus that processes a captured image will be described by way of example.

Further, the image processing apparatus can be mounted on a moving object such as a vehicle, a drone, or a robot and used when a distance to the object is measured and processing such as avoiding a collision with the object is performed. The present technology can be applied to a moving object that moves autonomously, a machine installed in a manufacturing line of a factory, or the like. Hereinafter, a case in which the image processing apparatus to which the present technology is applied is mounted on a vehicle will be described by way of example.

Figure 1:
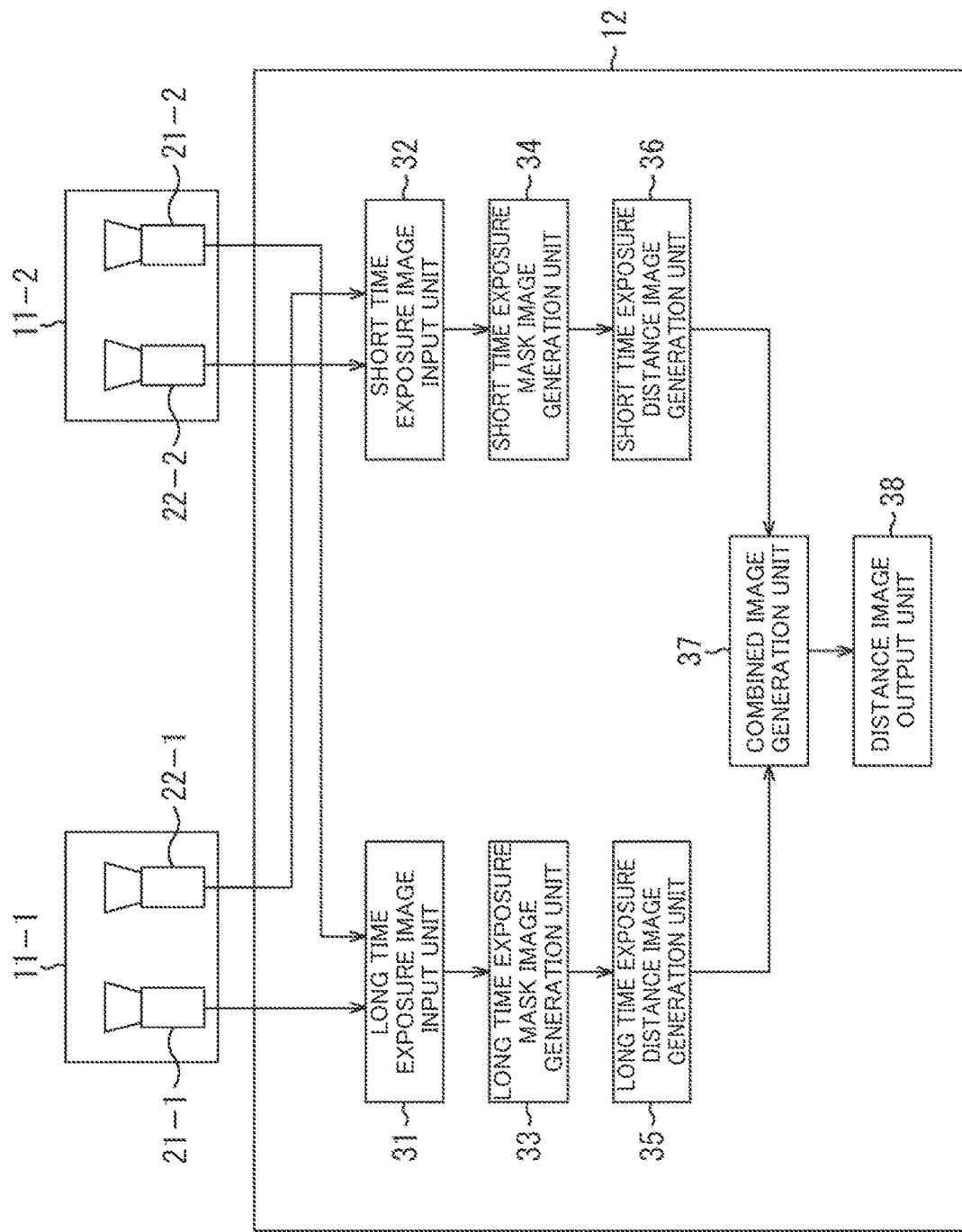
FIG. 1 is a diagram illustrating a configuration in a first embodiment of an image processing apparatus to which the present invention is applied.

<Configuration of image processing apparatus in first embodiment> FIG. 1 is a diagram illustrating a configuration of an embodiment of an image processing apparatus to which the present technology is applied. The image processing apparatus 12 according to a first embodiment illustrated in FIG. 1 is configured to process images captured by an imaging apparatus 11-1 and an imaging apparatus 11-2.

The imaging apparatus 11-1 and the imaging apparatus 11-2 are cameras disposed at a predetermined interval and are mounted on the left and right sides of a vehicle, for example. Here, the imaging apparatus 11-1 is assumed to be a camera mounted on the left side of the vehicle and will be described hereinafter as a left imaging apparatus 11-1. Further, the imaging apparatus 11-2 is assumed to be a camera mounted on the right side of the vehicle, and will be described hereinafter as a right imaging apparatus 11-2. When it is not necessary for the left imaging apparatus 11-1 and the right imaging apparatus 11-2 to be distinguished individually, they are simply described as the imaging apparatus 11. Other parts will be described in the same way.

The left imaging apparatus 11-1 and the right imaging apparatus 11-2 constitute a set of stereo cameras, and an image captured by the left imaging apparatus 11-1 and an image captured by the right imaging apparatus 11-2 can be processed using the fact that there is a parallax between the images such that a distance can be measured and a distance image can be generated.

The distance image is an image colored according to the distance. Here, the distance is assumed to be a distance from the imaging apparatus 11 to an object that is a measurement target, but may be, for example, a distance from a center of the vehicle to the object or a distance from a distal end of the vehicle to the object, or the distance may be a distance from a reference position that is any position of a device on which the image processing apparatus 12 is mounted.

The left imaging apparatus 11-1 includes a long-time exposure camera 21-1 and a short-time exposure camera 22-1. Hereinafter, the long-time exposure camera 21-1 and the short-time exposure camera 22-1 included in the left imaging apparatus 11-1 will be described as a left long-time exposure camera 21-1 and a left short-time exposure camera 22-1.

Similarly, the right imaging apparatus 11-2 includes a long-time exposure camera 21-2 and a short-time exposure camera 22-2. Hereinafter, the long-time exposure camera 21-2 and the short-time exposure camera 22-2 included in the right imaging apparatus 11-2 will be described as a right long-time exposure camera 21-2 and a right short-time exposure camera 22-2.

In the following description, when it is not necessary to distinguish between the left long-time exposure camera 21-1 and the right long-time exposure camera 21-2 individually, the left long-time exposure camera 21-1 and the right long-time exposure camera 21-2 are simply described as a long-time exposure camera 21. Similarly, when it is not necessary to distinguish between the left short-time exposure camera 22-1 and the right short-time exposure camera 22-2 individually, the left short-time exposure camera 22-1 and the right short-time exposure camera 22-2 are simply described as a short-time exposure camera 22.

The long-time exposure camera 21 performs exposure for a time longer than the exposure time of the short-time exposure camera 22 and captures an image. The long-time exposure image captured by the long-time exposure camera 21 is combined with the short-time exposure image captured by the short-time exposure camera 22 such that a wide dynamic range image (HDR image) can be obtained.

One image is generated through a combination process in which the long-time exposure image and the short-time exposure image are captured individually, the long-time exposure image is used for a dark image region, and the short-time exposure image is used for a bright image region overexposed in the long-time exposure image, such that a wide dynamic range image (HDR image) can be obtained.

Figure 2:
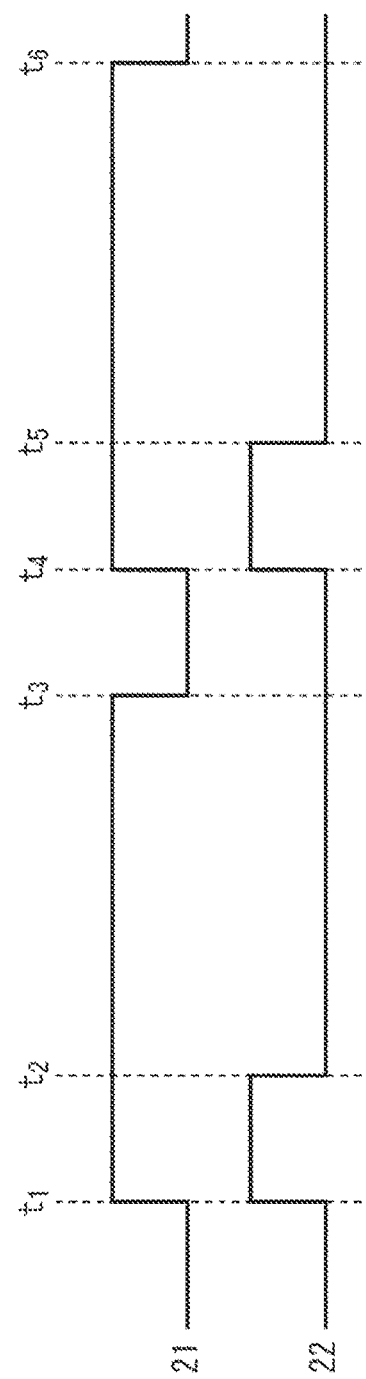
FIG. 2 is a timing chart regarding an exposure time.

The exposure of the long-time exposure camera 21 and the exposure of the short-time exposure camera 22 are controlled, for example, at a timing as illustrated in FIG. 2. At time t1, both the long-time exposure camera 21 and the short-time exposure camera 22 start exposure. At time t2, the short-time exposure camera 22 stops the exposure. Then, the long-time exposure camera 21 stops the exposure at time t3.

The long-time exposure camera 21 performs exposure from time t1 to time t3 (referred to as time T1), and the short-time exposure camera 22 performs exposure from time t1 to time t2 (referred to as time T2). Time T1 is a longer time than time T2. By the exposure being controlled in this way, the long-time exposure camera 21 performs exposure for a time longer than the exposure time of the short-time exposure camera 22 and captures an image.

A timing of exposure start or end is an example, and as long as an exposure time of the long-time exposure camera 21 is controlled so that the exposure time of the long-time exposure camera 21 is longer than an exposure time of the short-time exposure camera 22, any timing of the exposure start, for example, can be applied to the present technology.

The description will continue with an example in which long-time exposure and short-time exposure are provided, but other exposure times may be provided and images with a plurality of exposure times may be combined so that the HDR image is generated.

Figure 3:
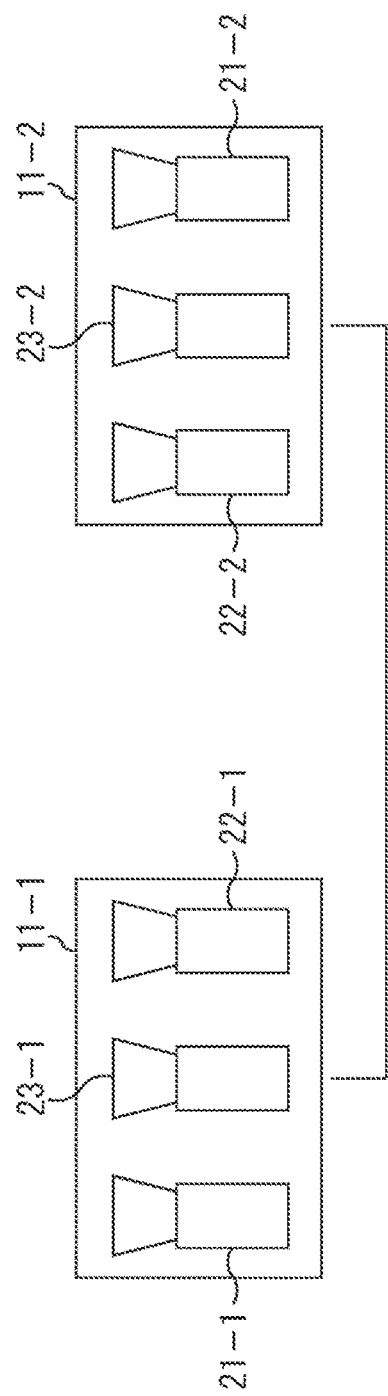
FIG. 3 is a diagram illustrating a disposition of cameras.

For example, a configuration in which the long-time exposure camera 21 for long-time exposure, the short-time exposure camera 22 for short-time exposure, and a medium-time exposure camera 23 for medium-time exposure between long-time exposure and short-time exposure are included as illustrated in FIG. 3 may be adopted.

The left imaging apparatus 11-1 illustrated in FIG. 3 includes three cameras including the left long-time exposure camera 21-1, the left short-time exposure camera 22-1, and a left medium-time exposure camera 23-1. Similarly, the right imaging apparatus 11-2 includes three cameras including the right long-time exposure camera 21-2, the right short-time exposure camera 22-2, and a right medium-time exposure camera 23-2.

Such a multi-lens stereo camera can also be used in the present technology. That is, the present technology can be applied to a case in which one imaging apparatus 11 includes n cameras that capture images at n (n is equal to or greater than 2) different exposure times. Further, one imaging apparatus 11 may include one camera, as illustrated in FIGS. 4A and 4B.

Figure 4A:
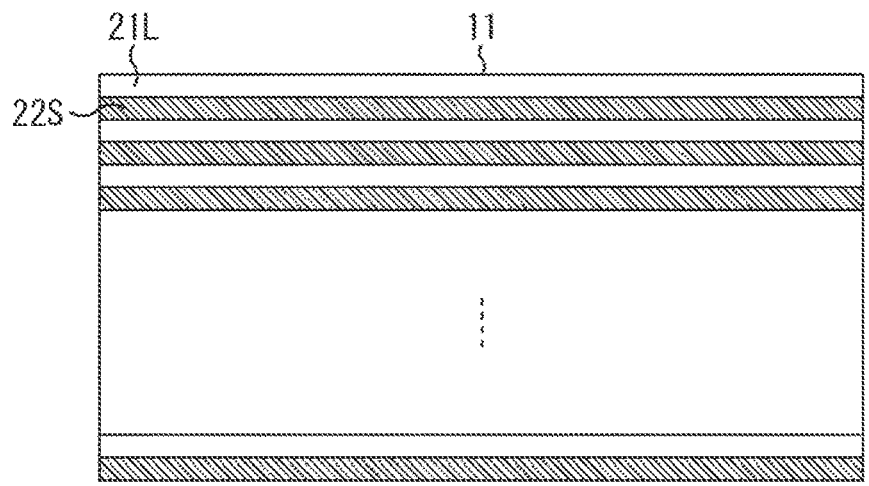
FIGS. 4A and 4B are diagrams illustrating a disposition of lines or pixels.
Figure 4B:
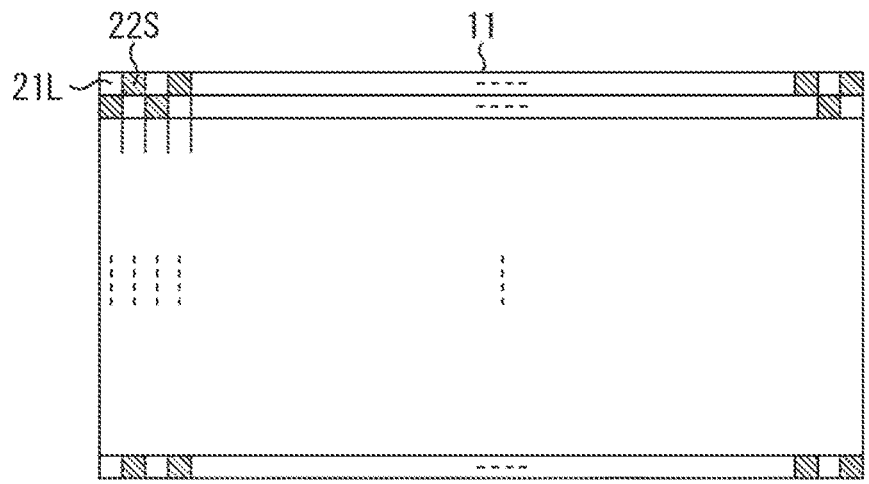

FIGS. 4A and 4B are diagrams illustrating a case in which one imaging apparatus 11 includes one camera. A case in which long-time exposure and short-time exposure are performed by one camera will be described by way of example with reference to FIGS. 4A and 4B, but the present technology can also be applied to a case in which n different exposure times are provided in one camera, as described with reference to FIG. 3.

As illustrated in FIG. 4A, a long-time exposure line 21L and a short-time exposure line 22S are alternately disposed, and the long-time exposure line 21L constitutes the long-time exposure camera 21 and the short-time exposure line 22S constitutes the short-time exposure camera 22.

As illustrated in FIG. 4B, long-time exposure pixels 21L and short-time exposure pixels 22S are alternately disposed in a vertical direction and a horizontal direction, and the long-time exposure pixels 21L constitute the long-time exposure camera 21 and the short-time exposure pixel 22S constitute the short-time exposure camera 22.

As illustrated in FIGS. 4A and 4B, the imaging apparatus 11 may be configured to perform long-time exposure and short-time exposure for each line or may be configured to perform long-time exposure and short-time exposure for each line and each pixel.

A case in which one imaging apparatus 11 includes two cameras including the long-time exposure camera 21 and the short-time exposure camera 22 as illustrated in FIG. 1 will be described herein by way of example. Two cameras including the long-time exposure camera 21 and the short-time exposure camera 22 can be disposed as illustrated in FIGS. 5A, 5B, and 5C.

The disposition example illustrated in A of FIG. 5A is a disposition example in which the long-time exposure camera 21 and the short-time exposure camera 22 are disposed in a horizontal direction. Further, the disposition example illustrated in A of FIG. 5A is a disposition example in which the long-time exposure camera 21 is disposed on the outer side and the short-time exposure camera 22 is disposed on the inner side. The left long-time exposure camera 21-1 of the left imaging apparatus 11-1 is disposed on the outer side, and the left short-time exposure camera 22-1 is disposed on the inner side. Similarly, the right long-time exposure camera 21-2 of the right imaging apparatus 11-2 is disposed on the outer side, and the right short-time exposure camera 22-2 is disposed on the inner side.

In the case of such a disposition, a distance between the left long-time exposure camera 21-1 and the right long-time exposure camera 21-2 differs from a distance between the left short-time exposure camera 22-1 and the right short-time exposure camera 22-2. In the case of this disposition, the disposition is a disposition in which both the baseline and the exposure time differ.

A disposition example illustrated in FIG. 5B is a disposition example in which the long-time exposure camera 21 and the short-time exposure camera 22 are disposed in the horizontal direction. Further, the disposition example illustrated in FIG. 5B is a disposition example in which the disposition of the left long-time exposure camera 21-1 and the left short-time exposure camera 22-1 constituting the left imaging apparatus 11-1 is the same as the disposition of the right long-time exposure camera 21-2 and the right short-time exposure camera 22-2 constituting the right imaging apparatus 11-2.

The left long-time exposure camera 21-1 of the left imaging apparatus 11-1 is disposed on the outer side, and the left short-time exposure camera 22-1 is disposed on the inner side. On the other hand, the right long-time exposure camera 21-2 of the right imaging apparatus 11-2 is disposed on the inner side, and the right short-time exposure camera 22-2 is disposed on the outer side.

In the case of such a disposition, the distance between the left long-time exposure camera 21-1 and the right long-time exposure camera 21-2 and the distance between the left short-time exposure camera 22-1 and the right short-time exposure camera 22-2 become the same. In the case of this disposition, the baseline is common and the disposition is a disposition in which the exposure time is different.

A disposition example illustrated in FIG. 5C is a disposition example in which the long-time exposure camera 21 and the short-time exposure camera 22 are disposed in a vertical direction. Further, the disposition example illustrated in FIG. 5C is a disposition example in which the long-time exposure camera 21 is disposed on the upper side and the short-time exposure camera 22 is disposed on the lower side.

The left long-time exposure camera 21-1 of the left imaging apparatus 11-1 is disposed on the upper side in the vertical direction, and the left short-time exposure camera 22-1 is disposed on the lower side in the vertical direction. Similarly, the right long-time exposure camera 21-2 of the right imaging apparatus 11-2 is disposed on the upper side in the vertical direction, and the right short-time exposure camera 22-2 is disposed on the lower side in the vertical direction.

In the case of such a disposition, the distance between the left long-time exposure camera 21-1 and the right long-time exposure camera 21-2 and the distance between the left short-time exposure camera 22-1 and the right short-time exposure camera 22-2 become the same. In the case of this disposition, the baseline is common and the disposition is a disposition in which the exposure time is different.

Although not illustrated, the long-time exposure camera 21 may be disposed on the lower side in the vertical direction, and the short-time exposure camera 22 may be disposed on the upper side in the vertical direction.

Here, the long-time exposure camera 21 and the short-time exposure camera 22 may be disposed in a disposition example that is not illustrated. Hereinafter, the description will continue with a disposition example in which the long-time exposure camera 21 and the short-time exposure camera 22 are disposed in a horizontal direction as illustrated in FIG. 5A or 5B. Further, hereinafter, the description will continue with a case in which there are two imaging apparatuses 11 as illustrated in FIG. 1, but the present technology can also be applied to a configuration in which a long-time exposure camera or a short-time exposure camera is further added to the two imaging apparatuses 11 as illustrated in FIG. 6.

Figure 6:
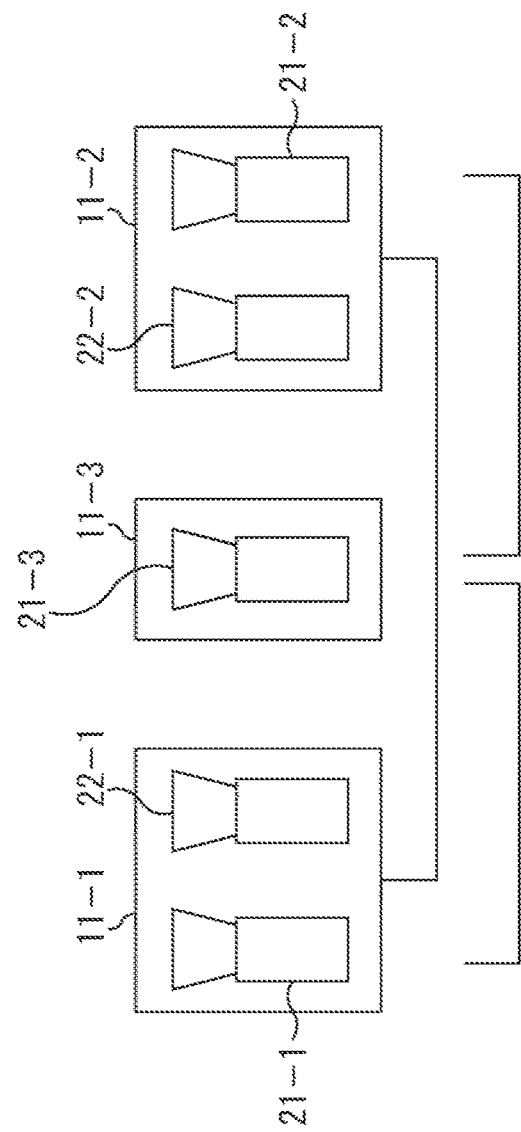
FIG. 6 is a diagram illustrating a disposition of cameras.

Referring to FIG. 6, a medium imaging apparatus 11-3 is added between the left imaging apparatus 11-1 and the right imaging apparatus 11-2. Further, the medium imaging apparatus 11-3 includes a medium- and long-time exposure camera 21-3 that captures an image with long-time exposure. With this configuration, in the long-time exposure camera 21, it is possible to achieve stereo support with three pairs.

A first pair is a pair of the left long-time exposure camera 21-1 and the right long-time exposure camera 21-2. A second pair is a pair of the left long-time exposure camera 21-1 and the medium and long-time exposure camera 21-3. The third pair is a pair of the right long-time exposure camera 21-2 and the medium- and long-time exposure camera 21-3.

Further, according to the configuration illustrated in FIG. 6, there is also a pair of the left short-time exposure camera 22-1 and the right short-time exposure camera 22-2 for stereo support. Thus, a configuration in which processing is performed for support of a plurality of stereos may be adopted.

The medium imaging apparatus 11-3 may include a medium short-time exposure camera 22-3 (not illustrated). In this case, in the short-time exposure camera 22, it is possible to achieve stereo support with three pairs.

With the configuration described with reference to FIG. 6, for example, even when imaging is not performed by the left imaging apparatus 11-1, it is possible to achieve stereo support using a pair of the medium imaging apparatus 11-3 and the right imaging apparatus 11-2 by performing imaging using the medium imaging apparatus 11-3, and to measure the distance.

For example, when the imaging apparatus 11 is mounted on a vehicle, mud, leaves, or the like are likely to stick to the cameras and an image is likely to be unable to be captured. Even when such a state occurs, the configuration illustrated in FIG. 6 is adopted such that imaging is performed by the medium imaging apparatus 11-3 rather than the camera that cannot capture an image, and stereo support is achieved.

The camera constituting the imaging apparatus 11 may be a camera that captures a monochrome image or a camera that captures a color image. Further, the camera may be a near infrared (NIR) camera or a far infrared (FIR) camera. Further, it is possible to adopt a configuration in which a color camera is combined with a near infrared camera or a configuration in which a color camera is combined with a far infrared camera.

The description will now return to FIG. 1.

The image processing apparatus 12 acquires and processes the respective images captured by the left imaging apparatus 11-1 and the right imaging apparatus 11-2. The imaging apparatus 11 may capture still images at predetermined intervals and supply the still images to the image processing apparatus 12 at an imaging timing so that the images are input to the image processing apparatus 12.

Alternatively, the imaging apparatus 11 may capture a moving image and continuously supply the image (frame) to the image processing apparatus 12 so that the image is input to the image processing apparatus 12. Alternatively, the image processing apparatus 12 may control the imaging apparatus 11 at a predetermined timing so that an image is captured by the imaging apparatus 11 and is acquired from the imaging apparatus 11.

The image captured by the left long-time exposure camera 21-1 of the left imaging apparatus 11-1 (hereinafter referred to as a left long-time exposure image) and the image captured by the right long-time exposure camera 21-2 of the right imaging apparatus 11-2 (hereinafter referred to as a right long-time exposure image) are supplied to a long-time exposure image input unit 31.

The image captured by the left short-time exposure camera 22-1 of the left imaging apparatus 11-1 (hereinafter referred to as a left short-time exposure image) and the image captured by the right short-time exposure camera 22-2 of the right imaging apparatus 11-2 (hereinafter referred to as a left short-time exposure image) are supplied to a short-time exposure image input unit 32.

The left long-time exposure image and the right long-time exposure image input to the long-time exposure image input unit 31 are supplied to the long-time exposure mask image generation unit 33. The left short-time exposure image and the right short-time exposure image input to the short-time exposure image input unit 32 are supplied to the short-time exposure mask image generation unit 34.

The long-time exposure mask image generation unit 33 extracts a saturated region and a blackened region of the supplied left long-time exposure image and the supplied right long-time exposure image, and generates an image in which these regions have been masked. The image generated as a result of masking the left long-time exposure image is described as a left long-time exposure mask image, and the image generated as a result of masking the right long-time exposure image is described as a right long-time exposure mask image.

The short-time exposure mask image generation unit 34 extracts a saturated region and a blackened region of the supplied left short-time exposure image and the supplied right short-time exposure image, and generates an image in which these regions have been masked. The image generated as a result of masking the left short-time exposure image is described as a left short-time exposure mask image, and the image generated as a result of masking the right short-time exposure image is described as a right short-time exposure mask image.

The left long-time exposure mask image and the right long-time exposure mask image generated by the long-time exposure mask image generation unit 33 are supplied to a long-time exposure distance image generation unit 35. The long-time exposure distance image generation unit 35 calculates a parallax from the left long-time exposure mask image and the right long-time exposure mask image to generate a distance image. The generated distance image is described as a long-time exposure distance image. Although the description will continue herein with an example in which the parallax is calculated using the masked long-time exposure mask image, a mask process may not be performed in the long-time exposure mask image generation unit 33 and the parallax may be calculated from the left long-time exposure image and the right long-time exposure image, for example.

The left short-time exposure mask image and the right short-time exposure mask image generated by the short-time exposure mask image generation unit 34 are supplied to a short-time exposure distance image generation unit 36. The short-time exposure distance image generation unit 36 calculates a parallax from the left short-time exposure mask image and the right short-time exposure mask image to generate a distance image. The generated distance image is described as a short-time exposure distance image. Although the description will continue herein with an example in which the parallax is calculated using the masked short-time exposure mask image, a mask process may not be performed in the short-time exposure mask image generation unit 34 and the parallax may be calculated from the left short-time exposure image and the right short-time exposure image, for example.

The long-time exposure distance image generated by the long-time exposure distance image generation unit 35 and the short-time exposure distance image generated by the short-time exposure distance image generation unit 36 are supplied to a combined image generation unit 37. The combined image generation unit 37 combines the long-time exposure distance image with the short-time exposure distance image to generate a distance image. For the long-time exposure distance image and the short-time exposure distance image, because a distance image is not generated in the masked region, a combination for supplementing the region having no distance image is performed.

The distance image generated by the combined image generation unit 37 is supplied to a distance image output unit 38 and output to a processing unit (not illustrated) in a subsequent stage.

Operation of Image Processing Apparatus According to First Embodiment

An operation of the image processing apparatus 12 illustrated in FIG. 1 will be described with reference to the flowchart of FIG. 7. Further, a specific processing example of each type of processing in the flowchart of FIG. 7 will be described with reference to FIGS. 8 and 9.

In step S11, the long-time exposure image input unit 31 acquires the left long-time exposure image captured by the left long-time exposure camera 21-1 of the left imaging apparatus 11-1 and the right long-time exposure image captured by the right long-time exposure camera 21-2 of the right imaging apparatus 11-2. The acquired left long-time exposure image and the acquired right long-time exposure image are supplied to the long-time exposure mask image generation unit 33.

In step S12, the short-time exposure image input unit 32 acquires the left short-time exposure image captured by the left short-time exposure camera 22-1 of the left imaging apparatus 11-1 and the right short-time exposure image captured by the right short-time exposure camera 22-2 of the right imaging apparatus 11-2. The acquired left short-time exposure image and the acquired right short-time exposure image are supplied to the short-time exposure mask image generation unit 34.

In step S13, the long-time exposure mask image generation unit 33 extracts the saturated region and the blackened region of the supplied left long-time exposure image and the supplied right long-time exposure image, and generates a left long-time exposure mask image and a right long-time exposure mask image in which these regions have been masked. The image obtained by long-time exposure is likely to have a saturated region in which a saturation capacity of an imaging element is exceeded, that is, a region in which so-called overexposure occurs.

The long-time exposure mask image generation unit 33 determines whether or not a pixel value of the long-time exposure image is larger than a predetermined threshold value V1, and generates a long-time exposure mask image in which pixels larger than the threshold value V1 have been masked. By performing such a determination, it is possible to extract a saturated region and generate a mask image in which the region determined to be saturated has been masked.

In step S14, the short-time exposure mask image generation unit 34 extracts a saturated region and a blackened region of the supplied left short-time exposure image and the supplied right short-time exposure image, and generates a left short-time exposure mask image and a right short-time exposure mask image in which these regions have been masked. The image obtained through short-time exposure is likely to be a blackened region.

The short-time exposure mask image generation unit 34 determines whether or not a pixel value of the short-time exposure image is larger than a predetermined threshold value V2, and generates a short-time exposure mask image in which pixels larger than the threshold value V2 have been masked. By performing such a determination, it is possible to extract a blackened region and generate a mask image in which the region determined to be blackened has been masked.

Figure 8:
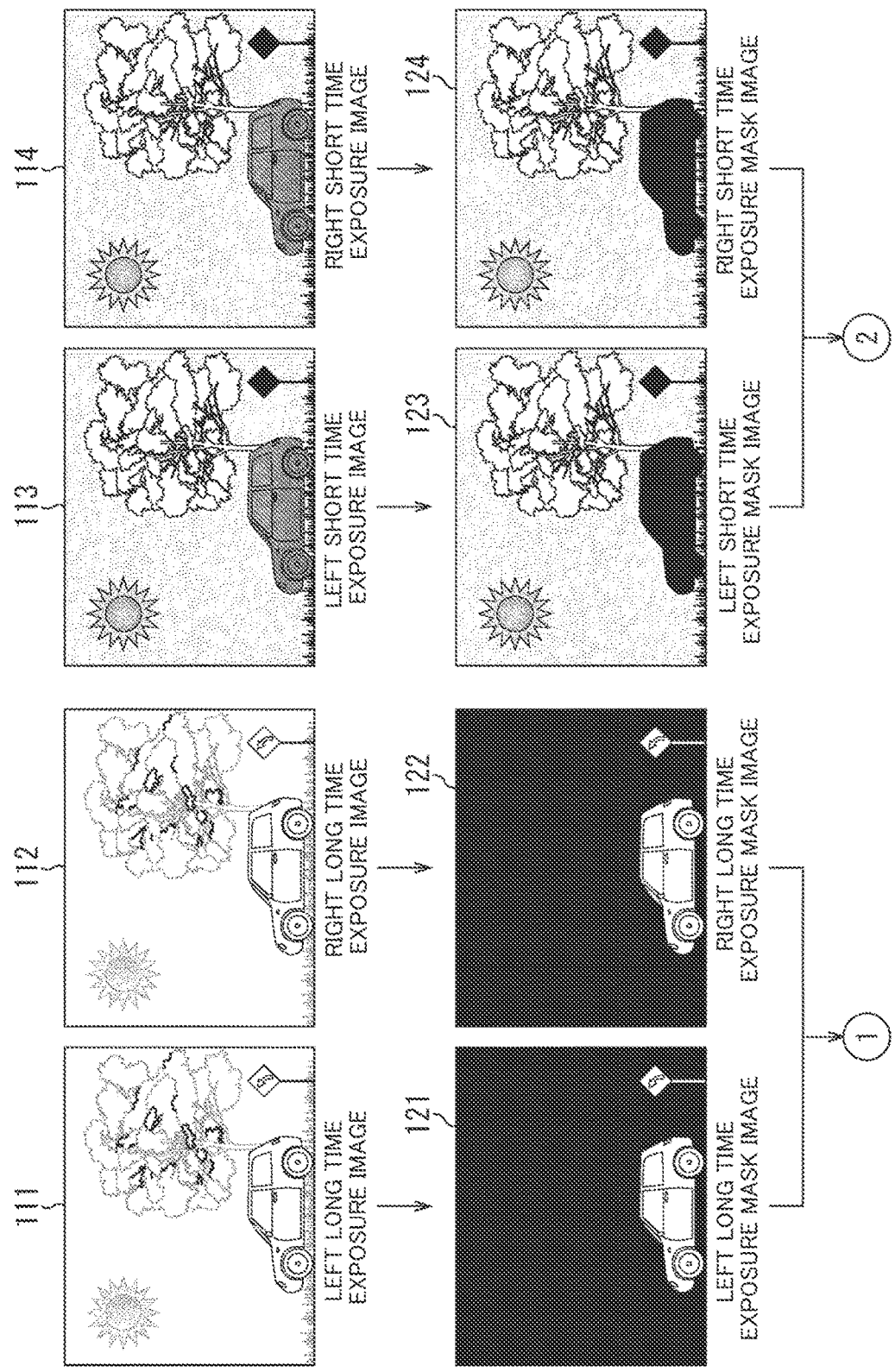
FIG. 8 is a diagram illustrating a way of generating a distance image.

The processing up to here will be described again with reference to FIG. 8. Four images illustrated in an upper part of FIG. 8 represent a left long-time exposure image 111, a right long-time exposure image 112, a left short-time exposure image 113, and a right short-time exposure image 114. It is assumed that these images are images captured when the exposure is started at the same time.

The left long-time exposure image 111 and the right long-time exposure image 112 are images with a deviation corresponding to the parallax, but because the exposure times are the same, the saturated regions are substantially the same. Further, the left short-time exposure image 113 and the right short-time exposure image 114 are images with a deviation corresponding to the parallax, but because the exposure times are the same, the blackened region is substantially the same.

In these images, the sun, trees, vehicles, signs, and the like are captured. In the left long-time exposure image 111 and the right long-time exposure image 112, for example, a region in which the sky or trees are imaged is assumed to be the saturated region. Further, in the left short-time exposure image 113 and the right short-time exposure image 114, for example, a region in which vehicles or signs are imaged is assumed to be a blackened region.

When such an image is processed by the long-time exposure mask image generation unit 33 and the short-time exposure mask image generation unit 34, a mask image as illustrated in a lower part of FIG. 8 is generated.

The left long-time exposure image 111 and the right long-time exposure image 112 are processed by the long-time exposure mask image generation unit 33, so that a left long-time exposure mask image 121 and a right long-time exposure mask image 122 in which regions other than the region in which the vehicle and the sign are imaged have been masked are generated.

The left short-time exposure image 113 and the right short-time exposure image 114 are processed by the short-time exposure mask image generation unit 34, so that a left short-time exposure mask image 123 and a right short-time exposure mask image 124 in which regions other than the region in which the vehicle and the sign are imaged have been masked are generated.

Such processing is executed in steps S11 to S14.

Figure 7:
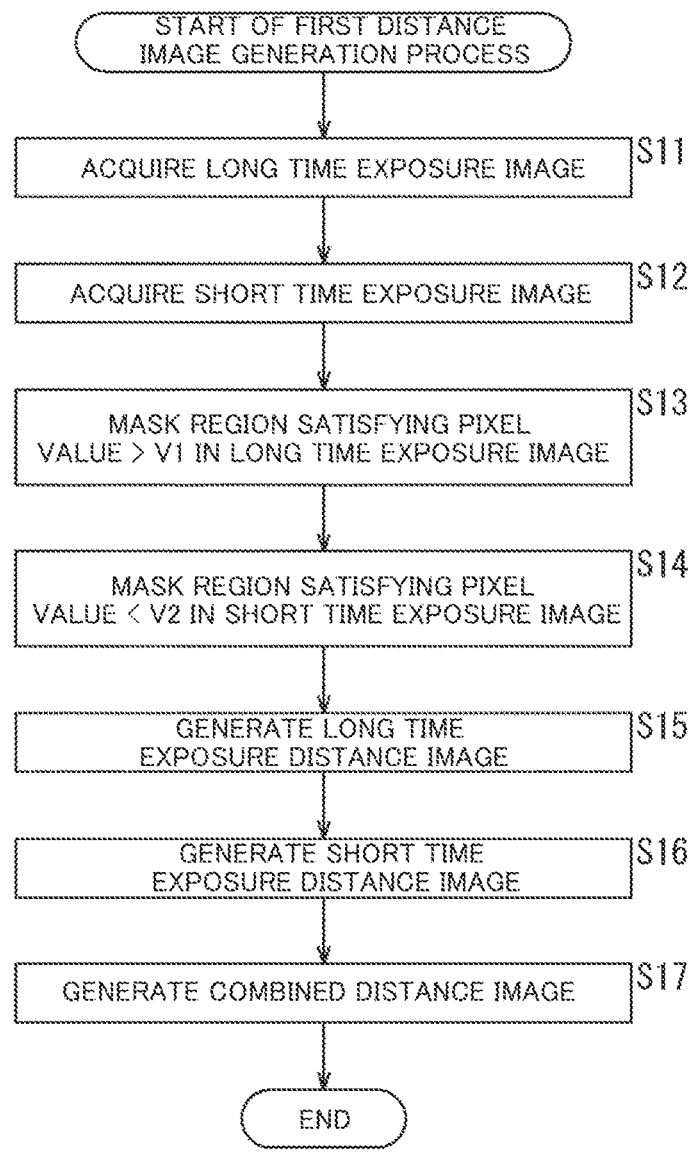
FIG. 7 is a flowchart illustrating an operation of the image processing apparatus.

Returning to the description with reference to the flowchart of FIG. 7, in step S15, the long-time exposure distance image generation unit 35 generates the long-time exposure distance image. The mask image in which the saturated region has been masked is supplied from the long-time exposure mask image generation unit 33 to the long-time exposure distance image generation unit 35. For example, the left long-time exposure mask image 121 and the right long-time exposure mask image 122 in which regions other than the region in which the vehicle and the sign have been masked are supplied to the long-time exposure distance image generation unit 35, as described with reference to FIG. 8.

The left long-time exposure mask image 121 and the right long-time exposure mask image 122 are images with a deviation corresponding to the parallax, and the long-time exposure distance image generation unit 35 calculates the parallax using the left long-time exposure mask image 121 and the right long-time exposure mask image 122. For example, the parallax is calculated by stereo matching, and a depth map calculated on the basis of the parallax, that is, a distance image, is generated.

Figure 9:
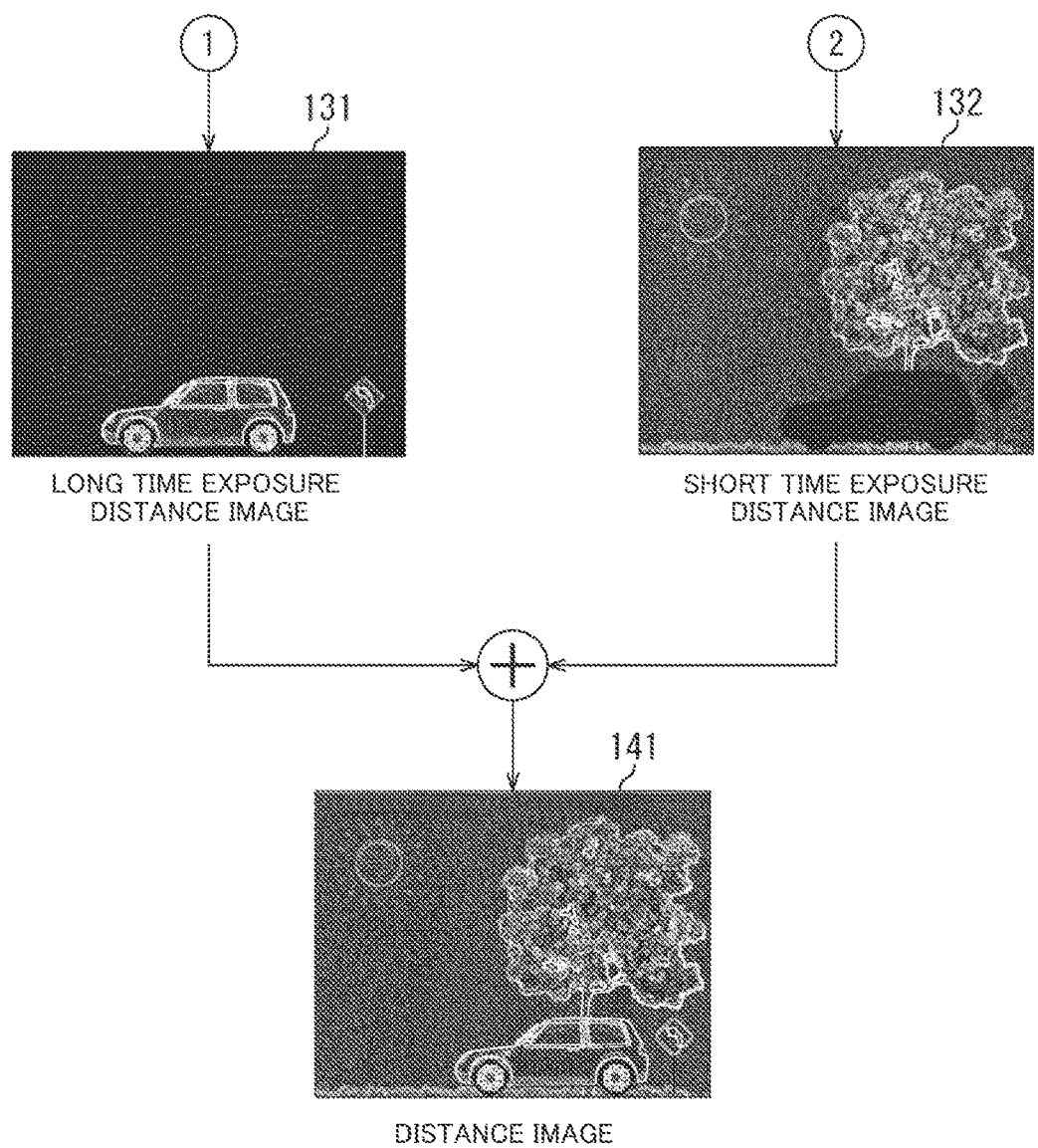
FIG. 9 is a diagram illustrating a way of generating a distance image.

For example, because the left long-time exposure mask image 121 and the right long-time exposure mask image 122 are images in which the regions of the vehicle and the sign remain unmasked, a parallax (distance) to the vehicle and the sign is calculated and a long-time exposure distance image 131 as illustrated in FIG. 9 is generated.

Returning to the description with reference to the flowchart of FIG. 7, in step S16, the short-time exposure distance image generation unit 36 generates the short-time exposure distance image. A mask image in which the blackened region has been masked is supplied from the short-time exposure mask image generation unit 34 to the short-time exposure distance image generation unit 36. For example, the left short-time exposure mask image 123 and the right short-time exposure mask image 124 in which the regions of the vehicle and the sign have been masked are supplied to the short-time exposure distance image generation unit 36, as described with reference to FIG. 8.

The left short-time exposure mask image 123 and the right short-time exposure mask image 124 are images with a deviation corresponding to the parallax, and the short-time exposure distance image generation unit 36 calculates the parallax using the left short-time exposure mask image 123 and the right short-time exposure mask image 124. For example, because the left short-time exposure mask image 123 and the right short-time exposure mask image 124 are images in which the region of the vehicle and the sign has been masked, a distance to an object other than the vehicle and the sign is calculated and a short-time exposure distance image 132 as illustrated in FIG. 9 is generated.

In step S17, the combined image generation unit 37 performs a process of combining the long-time exposure distance image 131 generated by the long-time exposure distance image generation unit 35 with the short-time exposure distance image 132 generated by the short-time exposure distance image generation unit 36.

For example, as illustrated in FIG. 9, the long-time exposure distance image 131 in which a distance to the vehicle and a distance to the sign are included as information is combined with the short-time exposure distance image 132 in which a distance to an object other than the vehicle and the sign is included as information so that a distance image 141 is generated. In this case, because a portion in which the distance information is missing in the long-time exposure distance image 131 is supplemented with the short-time exposure distance image 132, the generated distance image 141 can be an image in which there is no portion in which the distance information is missing.

When the long-time exposure distance image 131 is combined with the short-time exposure distance image 132, the distance information of the region missing in the long-time exposure distance image 131 is extracted from the short-time exposure distance image 132 and the combination is performed for supplementation. For example, for regions in which there is distance information in both the long-time exposure distance image 131 and the short-time exposure distance image 132, the distance information of the long-time exposure distance image 131 is preferentially used.

By combining the long-time exposure distance image 131 with the short-time exposure distance image 132, it is possible to obtain a distance image equivalent to that when a distance image has been generated from an image with a wide dynamic range. That is, it is possible to generate a distance image with a wide dynamic range. Further, the obtained distance image can be an image that is not affected by ghosts or the like.

One image is generated through a combination process in which the long-time exposure image and the short-time exposure image are captured individually, the long-time exposure image is used for a dark image region, and the short-time exposure image is used for a bright image region overexposed in the long-time exposure image, such that a wide dynamic range image (HDR image) can be obtained.

However, when there is a moving object, a position of the moving object in the long-time exposure image may differ from a position of the moving object in the short-time exposure image, and in such a case, when the long-time exposure image is combined with the short-time exposure image, a phenomenon such as blurring or a doubled or tripled object, and a phenomenon called a ghost occur in a combined image.

In the process according to the present embodiment described above, because the long-time exposure distance image 131 (FIG. 9) is generated from the left long-time exposure image 111 and the right long-time exposure image 112 (FIG. 8), no ghost phenomenon occurs in the generated long-time exposure distance image 131.

That is, because the left long-time exposure image 111 and the right long-time exposure image 112 have the same exposure time and the only difference is a parallax, a stereo image in which no ghost is generated at the time of combination can be obtained. Because the distance image is generated from such an image, a ghost phenomenon likewise does not occur in the long-time exposure distance image 131.

Similarly, because the short-time exposure distance image 132 (FIG. 9) is generated from the left short-time exposure image 113 and the right short-time exposure image 114 (FIG. 8), no ghost phenomenon occurs in the generated short-time exposure distance image 132.

That is, because the left short-time exposure image 113 and the right short-time exposure image 114 have the same exposure time and the only difference is a parallax, a correct distance image in which no ghost is generated can be obtained. Because the distance image is generated from such an image, a ghost phenomenon likewise does not occur in the short-time exposure distance image 132.

Because the long-time exposure distance image 131 and the short-time exposure distance image 132 in which no ghost phenomenon occurs are combined with each other so that the final distance image 141 is generated, the generated distance image 141 is also a correct distance image that is not affected by a ghost at all.

When the distance image is generated from an image in which the ghost phenomenon occurs, a determination cannot be made as to whether a portion of the ghost is a ghost or a deviation due to a parallax such that a distance image including incorrect distance information can be generated. However, it is possible to generate the distance image including the correct distance information as described above by generating the distance image using the present technology.

Further, because the long-time exposure distance image 131 (FIG. 9) is generated using the left long-time exposure mask image 121 and the right long-time exposure mask image 122 (FIG. 8) in which the saturated region has been masked, it is possible to obtain correct distance information in this respect as well.

When the distance information is acquired from the saturated region, a pixel value of the saturated region is not the correct pixel value, and thus the distance information calculated using such a pixel value is highly likely not to be the correct distance information.

However, according to the present technology, because the saturated region is masked so that the saturated region is not used as described above, in other words, because the distance information is calculated from the region in which the correct pixel value is assumed to be obtained, the obtained distance information is highly likely to be the correct distance information.

Similarly, because the short-time exposure distance image 132 (FIG. 9) is generated using the left short-time exposure mask image 123 and the right short-time exposure mask image 124 (FIG. 8) in which the blackened region has been masked, it is possible to obtain correct distance information in this respect as well.

That is, because the blackened region highly likely not to have a correct pixel value is masked so that the blackened region is not used, it is possible to calculate the distance information from only the region in which the correct pixel value is assumed to be obtained, and the obtained distance information is highly likely to be the correct distance information.

Further, the distance image 141 is generated by combining the long-time exposure distance image 131 with the short-time exposure distance image 132 (FIG. 9), but in this combination process, processing such as multiplying by a predetermined coefficient for absorbing a difference in exposure time may not be performed.

Normally, when an image at the time of long-time exposure is combined with an image at the time of short-time exposure, processing of absorbing a difference due to the exposure time such as a difference in brightness value so that the images can be treated as images captured with the same exposure time, for example, processing of multiplying by coefficients, is included.

According to the present embodiment, because the distance images (distance information) are combined instead of the images being combined, such processing need not be performed. Therefore, it is possible to omit setting an appropriate coefficient or processing of multiplying by a coefficient, and thus it is possible to eliminate an error likely to be generated by performing such setting or processing, and to enable distance measurement with higher accuracy.

Further, it is usually necessary for the exposure time to be changed depending on a scene to be imaged, in other words, it is necessary for the exposure time to be set depending on the scene and imaging to be performed so that saturation or blackening occurs as little as possible.

According to the embodiment, because it is not necessary to set the exposure time, it is possible to cope with a scene in which brightness suddenly changes due to a sudden change in the scene such as exiting a dark tunnel toward a bright place, and it is possible to perform correct distance measurement even when the sudden change in the scene occurs.

As described above, according to the present technology, when saturation or blackening occurs, a region in which the saturation or blackening occurs is masked so that the region is not used for distance measurement. On the other hand, information on the masked region can be obtained (interpolated) from other images in which the region is not masked. Therefore, because the present technology can also cope with a case in which saturation or blackening occurs, it is not necessary for the exposure time to be set depending on a scene so that such saturation or blackening do not occur.

Therefore, as described above, even when a sudden change in a scene occurs, it is possible to perform correct distance measurement and to perform stable processing.

Configuration of Image Processing Apparatus in Second Embodiment

Figure 10:
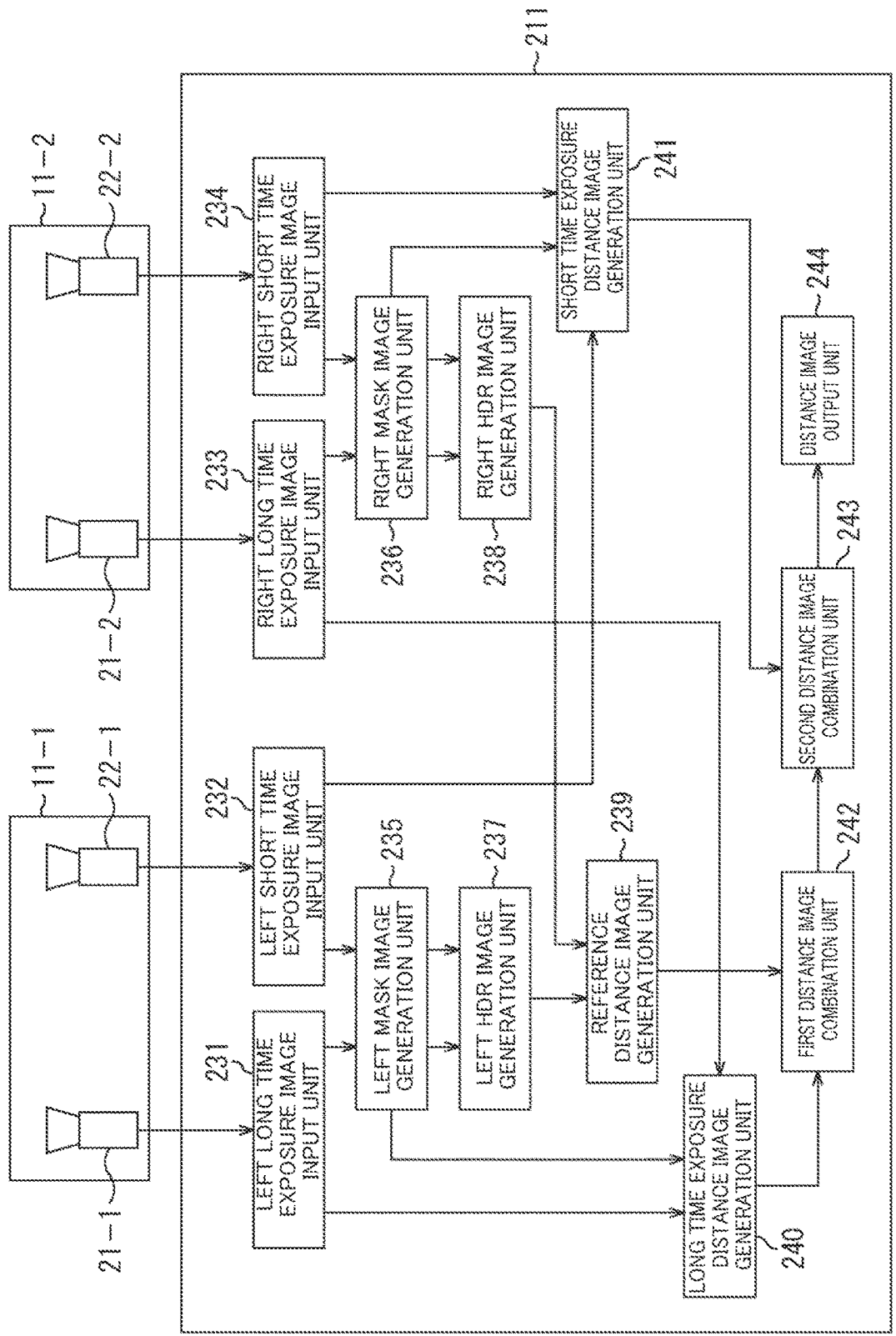
FIG. 10 is a diagram illustrating a configuration in a second embodiment of the image processing apparatus to which the present invention is applied.

FIG. 10 is a diagram illustrating a configuration of another embodiment (second embodiment) of the image processing apparatus to which the present technology is applied.

An image processing apparatus 211 in the second embodiment generates a distance image using images captured by the left imaging apparatus 11-1 and the right imaging apparatus 11-2, like the image processing apparatus 12 in the first embodiment. Configurations of the left imaging apparatus 11-1 and the right imaging apparatus 11-2 or a disposition of the cameras can be the same as that in the first embodiment.

The image processing apparatus 211 includes a left long-time exposure image input unit 231 that inputs a left long-time exposure image captured by the left long-time exposure camera 21-1 constituting the left imaging apparatus 11-1, and a left short-time exposure image input unit 232 that inputs a left short-time exposure image captured by the left short-time exposure camera 22-1 constituting the left imaging apparatus 11-1.

Further, the image processing apparatus 211 includes a right long-time exposure image input unit 233 that inputs a right long-time exposure image captured by the right long-time exposure camera 21-2 constituting the right imaging apparatus 11-2, and a right short-time exposure image input unit 234 that inputs a right short-time exposure image captured by the right short-time exposure camera 22-2 constituting the right imaging apparatus 11-2.

The left long-time exposure image input to the left long-time exposure image input unit 231 and the left short-time exposure image input to the left short-time exposure image input unit 232 are supplied to a left mask image generation unit 235. The left mask image generation unit 235 determines a moving subject using the left long-time exposure image and the left short-time exposure image and generates a mask image in which a region determined to be the moving subject has been masked.

The left mask image generation unit 235 generates a left long-time exposure mask image in which the left long-time exposure image has been masked and a left short-time exposure mask image in which the left short-time exposure image has been masked, and supplies the images to a left HDR generation unit 237.

The right long-time exposure image input to the right long-time exposure image input unit 233 and the right short-time exposure image input to the right short-time exposure image input unit 234 are supplied to a right mask image generation unit 236. The right mask image generation unit 236 determines a moving subject using the right long-time exposure image and the right short-time exposure image, and generates a mask image in which a region determined to be the moving subject has been masked.

The right mask image generation unit 236 generates a right long-time exposure mask image in which the right long-time exposure image has been masked and a right short-time exposure mask image in which the right short-time exposure image has been masked, and supplies the images to the right HDR generation unit 238.

The left HDR generation unit 237 combines the left long-time exposure mask image with the left short-time exposure mask image to generate an HDR image (described as a left HDR image). Because the generated left HDR image generated from the masked image, the left HDR image is an image in which the masked region is still masked. In this case, because the moving subject has been masked, the left HDR image in which the moving subject has been masked is generated. The generated left HDR image is supplied to a reference distance image generation unit 239. Here, although a case in which the HDR image is generated using the masked long-time exposure mask image and the masked short-time exposure mask image will be continuously described by way of example, a masking process in the left mask image generation unit 235 may not be performed and the left HDR image may be generated from the left long-time exposure image and the left short-time exposure image.

The right HDR generation unit 238 combines the right long-time exposure mask image with the right short-time exposure mask image to generate an HDR image (described as a right HDR image). Because the generated right HDR image generated from the masked image, the right HDR image is an image in which the masked region is still masked. In this case, because the moving subject has been masked, the right HDR image in which the moving subject has been masked is generated. The generated right HDR image is supplied to the reference distance image generation unit 239. Although the description will continue herein with an example in which the HDR image is generated using the masked long-time exposure mask image and the masked short-time exposure mask image, a masking process in the right mask image generation unit 236 may not be performed and the right HDR image may be generated from the right long-time exposure image and the right short-time exposure image.

The reference distance image generation unit 239 generates a distance image using the left HDR image and the right HDR image. The left HDR image is an HDR image generated from the image captured by the left imaging apparatus 11-1, and the right HDR image is an HDR image generated from the image captured by the right imaging apparatus 11-2. Using the left HDR image and the right HDR image, the distance image is generated by, for example, stereo matching.

Because the left HDR image and the right HDR image are images generated from the images in which the moving subject has been masked, the distance image is also an image in which the distance information of the region of the moving subject is missing. A distance image of this missing portion is generated by processing the long-time exposure image and the short-time exposure image, and is interpolated (combined). Here, in the reference distance image generation unit 239, a reference image for the distance image to be combined is described as a reference distance image.

The reference distance image generated by the reference distance image generation unit 239 is supplied to a first distance image combination unit 242. The long-time exposure distance image generated by a long-time exposure distance image generation unit 240 is also supplied to the first distance image combination unit 242.

The left long-time exposure image from the left long-time exposure image input unit 231, the right long-time exposure image from the right long-time exposure image input unit 233, and information on the masked region from the left mask image generation unit 235 are supplied to the long-time exposure distance image generation unit 240.

The long-time exposure distance image generation unit 240 generates a distance image of the masked region, in other words, a region determined to be the moving subject, using the left long-time exposure image and the right long-time exposure image. Because both the left long-time exposure image and the right long-time exposure image are long-time exposure images, the distance image can be generated without generation of a ghost even in a region of the moving subject.

The first distance image combination unit 242 combines the reference distance image from the reference distance image generation unit 239 and the long-time exposure distance image of the long-time exposure distance image generation unit 240. A distance image of a region corresponding to the masked region of the reference distance image is extracted from the long-time exposure distance image and combined. The distance image after combination is supplied to a second distance image combination unit 243.

A short-time exposure distance image generated by a short-time exposure distance image generation unit 241 is also supplied to the second distance image combination unit 243. The left short-time exposure image from the left short-time exposure image input unit 232, the right short-time exposure image from the right short-time exposure image input unit 234, and information on the masked region from the right mask image generation unit 236 are supplied to the short-time exposure distance image generation unit 241.

The short-time exposure distance image generation unit 241 generates a distance image of the masked region, in other words, a region determined to be the moving subject, using the left short-time exposure image and the right short-time exposure image. Because both the left short-time exposure image and the right short-time exposure image are short-time exposure images, the distance image can be generated without generation of a ghost even in a region of the moving subject.

The second distance image combination unit 243 combines the distance image from the first distance image combination unit 242 with the short-time exposure distance image of the short-time exposure distance image generation unit 241. The distance image from the first distance image combination unit 242 is already a distance image generated from the long-time exposure image, and the distance image of the masked region is interpolated. For a region not partitioned by interpolation, a corresponding distance image is extracted from the short-time exposure distance image and combined. The distance image after combination is supplied to a distance image output unit 244.

The distance image output unit 244 outputs the supplied distance image to a processing unit (not illustrated) in a subsequent stage.

Operation of Image Processing Apparatus in Second Embodiment

An operation of the image processing apparatus 211 illustrated in FIG. 10 will be described with reference to the flow chart of FIG. 11. Further, a specific processing example of each processing in the flowchart of FIG. 11 will be described with reference to FIGS. 12 to 15.

In step S111, the left long-time exposure image input unit 231 acquires the left long-time exposure image captured by the left long-time exposure camera 21-1 of the left imaging apparatus 11-1 and supplies the left long-time exposure image to the left mask image generation unit 235. Further, the left short-time exposure image input unit 232 acquires the left short-time exposure image captured by the left short-time exposure camera 22-1 of the left imaging apparatus 11-1 and supplies the left short-time exposure image to the left mask image generation unit 235.

In step S112, the left mask image generation unit 235 extracts the moving subjects of the supplied left long-time exposure image and the supplied left short-time exposure image, and generates the left long-time exposure mask image and the left short-time exposure mask image in which regions of the moving subjects have been masked.

The left mask image generation unit 235 performs, for example, a determination based on the following determination equation (1) to perform detection of the moving subject and masks pixels corresponding to the determination equation (1).

$$|(\text{left long-time exposure image}) \times (\text{coefficient } g1) - (\text{left short-time exposure image}) \times (\text{coefficient } g2)| > (\text{threshold value } Th1) \quad (1)$$

Because the left long-time exposure image and the left short-time exposure image have different exposure times, the left long-time exposure image and the left short-time exposure image are multiplied by the coefficients g1 and the coefficient g2, respectively, so that the images having the same exposure time can be compared with each other, and the subtraction is performed.

Because the left long-time exposure image and the left short-time exposure image are obtained by imaging the same scene only with different exposure times, pixel values at the same position are basically the same. However, in the case of a moving subject, the moving subject is likely to move in a time difference between the long-time exposure and the short-time exposure, and pixel values at the same position are likely not to be the same.

Equation (1) is an equation for subtracting a value obtained by multiplying the pixel value of the left short-time exposure image by the coefficient g2 from a value obtained by multiplying the pixel value of the left long-time exposure image by the coefficient g1, and determining whether or not an absolute value thereof is larger than the threshold value Th1. When the absolute value is larger than the threshold value Th1, this means that a difference between the pixel value of the left long-time exposure image and the pixel value of the left short-time exposure image is large, and such a region is highly likely to be a region in which the moving subject is imaged, as described above.

In step S112, the left mask image generation unit 235 generates the left long-time exposure mask image in which the moving subject has been masked in the left long-time exposure image and the left short-time exposure mask image in which the moving subject has been masked in the left short-time exposure image and supplies the images to the left HDR generation unit 237.

In step S113, the left HDR generation unit 237 combines the supplied left long-time exposure mask image with the supplied left short-time exposure mask image to generates the left HDR image, and supplies the left HDR image to the reference distance image generation unit 239. An existing process can be applied for the process of combining the long-time exposure image with the short-time exposure image to generate an image with a wide dynamic range. For example, processing such as combination after multiplication by a coefficient for absorbing a difference in exposure time is performed, as in Equation (1).

Processes for the image captured by the right imaging apparatus 11-2 are executed in steps S114 to S116, as in the processes of steps S111 to S113 for the image captured by the left imaging apparatus 11-1.

In step S114, the right long-time exposure image input unit 233 acquires the right long-time exposure image captured by the right long-time exposure camera 21-2 of the right imaging apparatus 11-2, and supplies the right long-time exposure image to the right mask image generation unit 236.

Further, the right short-time exposure image input unit 234 acquires the right short-time exposure image captured by the right short-time exposure camera 22-2 of the right imaging apparatus 11-2 and supplies the right short-time exposure image to the right mask image generation unit 236.

In step S115, the right mask image generation unit 236 extracts the moving subjects of the supplied right long-time exposure image and the supplied right short-time exposure image, and generates the right long-time exposure mask image and the right short-time exposure mask image in which regions of the moving subjects have been masked. The mask processing in step S115 is basically performed like the mask processing in step S112.

That is, the detection of the moving subject is performed through a determination based on the following determination equation (2), and pixels corresponding to the determination equation (2) are masked.

$$|(\text{right long-time exposure image}) \times (\text{coefficient } g1) - (\text{right short-time exposure image}) \times (\text{coefficient } g2)| > (\text{threshold value } Th2) \quad (2)$$

In Equation (2), the threshold value Th2 is set, but the threshold value may be the same as the threshold value Th1 (Equation (1)). Further, in Equation (2), the coefficient g1 and the coefficient g2 are set and described as the same coefficient as in Equation (1), but coefficients different from in Equation (1) may be used.

A pixel value (region) of which an absolute value is determined to be larger than the threshold value Th2 using a determination equation of Equation (2) is masked as a region in which the moving subject has been imaged.

In step S115, the right mask image generation unit 236 generates the right long-time exposure mask image in which the moving subject has been masked in the right long-time exposure image and the right short-time exposure mask image in which the moving subject has been masked in the right short-time exposure image and supplies the images to the right HDR generation unit 238.

In step S116, the right HDR generation unit 238 combines the supplied right long-time exposure mask image with the supplied right short-time exposure mask image to generates the right HDR image, and supplies the right HDR image to the reference distance image generation unit 239.

In step S117, the reference distance image generation unit 239 generates a reference distance image using the left HDR image and the right HDR image. The left HDR image and the right HDR image are images with a deviation corresponding to the parallax, and the reference distance image generation unit 239 calculates the parallax using the left HDR image and the right HDR image. For example, the parallax is calculated by stereo matching, and a depth map calculated on the basis of the parallax, that is, a distance image is generated.

Figure 12:
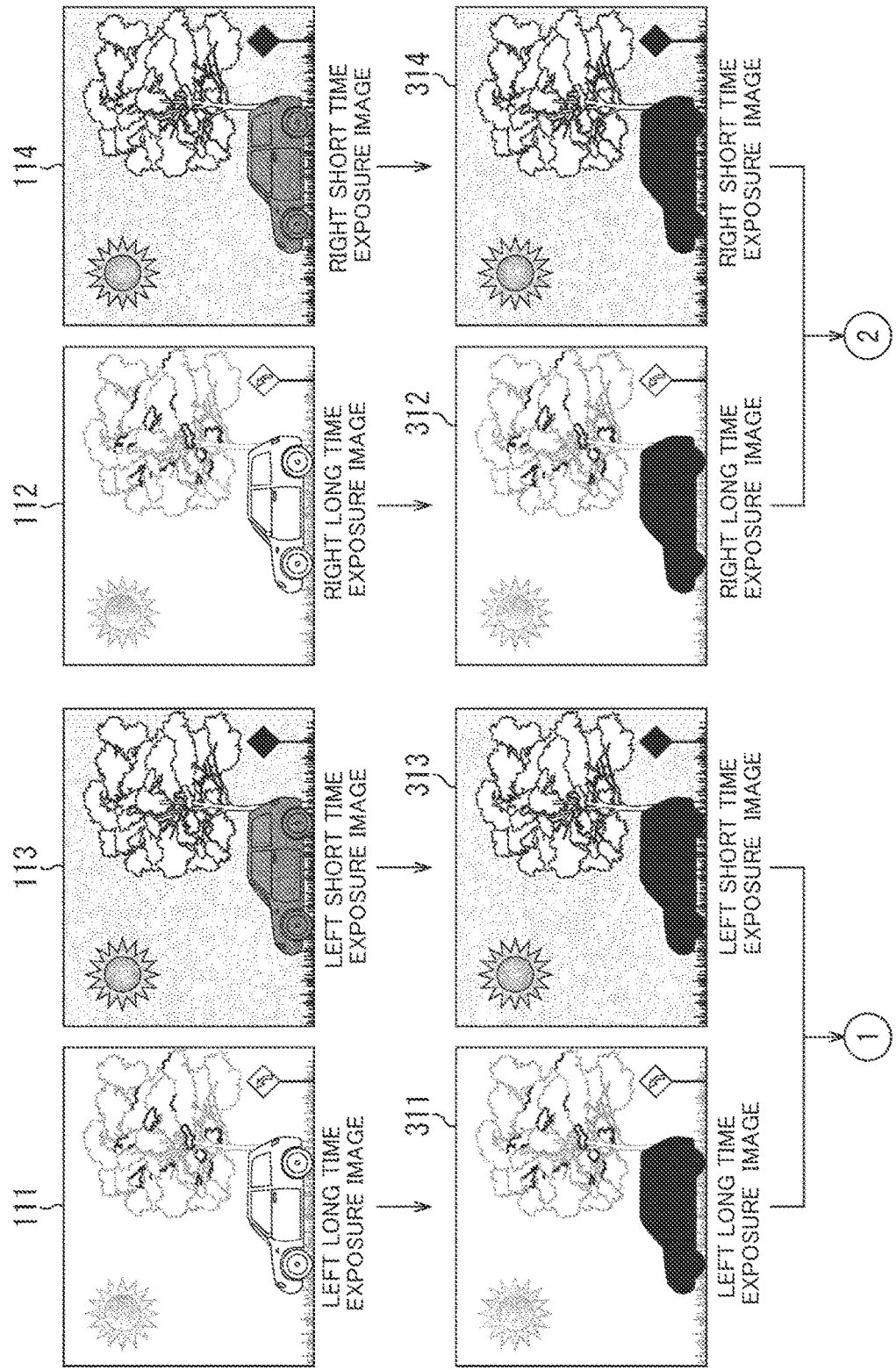
FIG. 12 is a diagram illustrating a way of generating a distance image.
Figure 13:
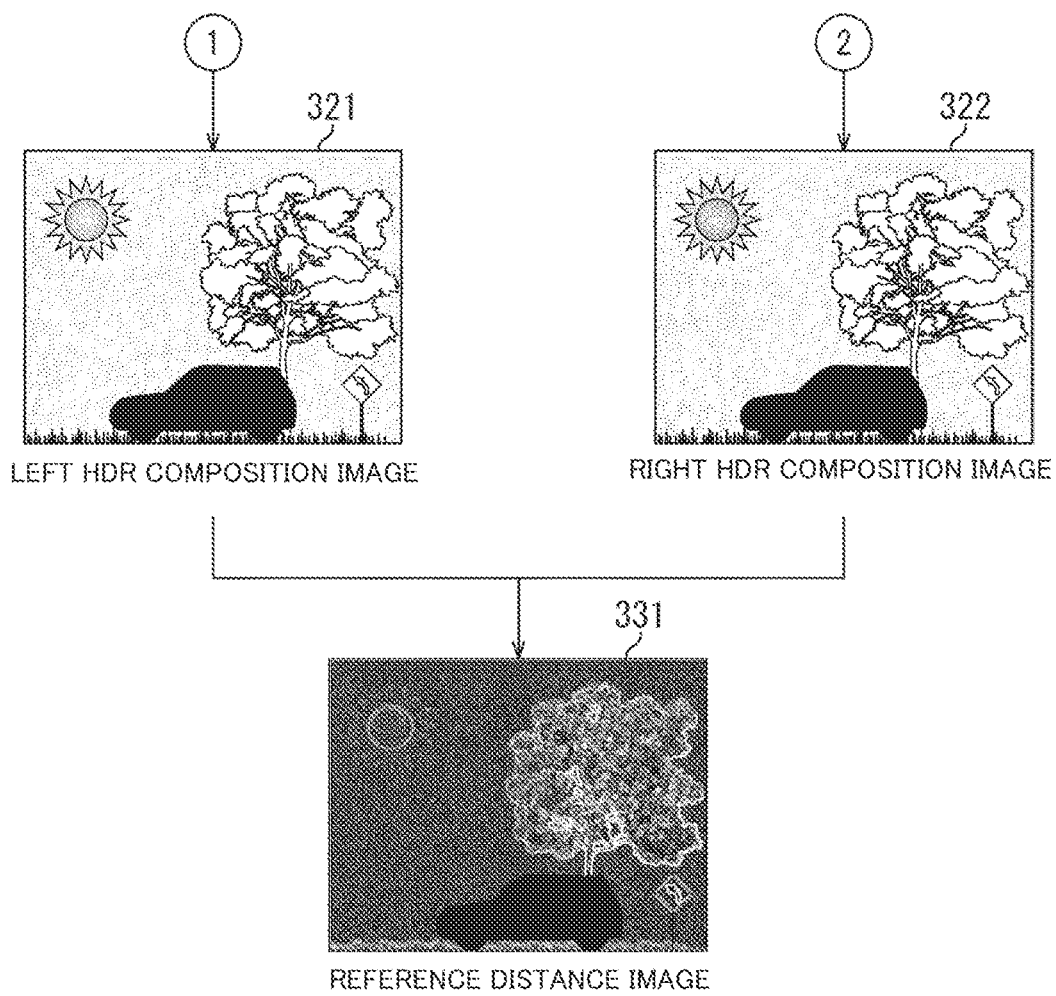
FIG. 13 is a diagram illustrating a way of generating a distance image.

The processing up to here will be described again with reference to FIGS. 12 and 13. Four images illustrated in an upper part of FIG. 12 represent the left long-time exposure image 111, the right long-time exposure image 112, the left short-time exposure image 113, and the right short-time exposure image 114, respectively. The description will be continued with an example in which these images are the same as the images illustrated in FIG. 8.

By the left long-time exposure image 111 being processed by the left mask image generation unit 235, a determination is made that the region of the vehicle is the moving subject, and the left long-time exposure mask image 311 in which the region of the vehicle has been masked is generated.

Similarly, by the left short-time exposure image 113 being processed by the left mask image generation unit 235, a determination is made that the region of the vehicle is the moving subject, and the left short-time exposure mask image 313 in which the region of the vehicle has been masked is generated.

A left HDR image 321 (FIG. 13) is generated from the left long-time exposure mask image 311 and the left short-time exposure mask image 313 generated in this way. The left HDR image 321 is also an image in which the region of the vehicle has been masked.

Thus, because the region of the moving subject is masked and the masked image is used to generate the HDR image, the generated left HDR image 321 can be an image in which a ghost is not generated.

The same process as the process for the left long-time exposure image 111 and the left short-time exposure image 113 captured by the left imaging apparatus 11-1 is performed on the right long-time exposure image 112 and the right short-time exposure image 114 captured by the right imaging apparatus 11-2.

By the right long-time exposure image 112 (FIG. 12) being processed by the right mask image generation unit 236, a determination is made that the region of the vehicle is the moving subject, and the right long-time exposure mask image 312 in which the region of the vehicle has been masked is generated.

Similarly, by the right short-time exposure image 114 being processed by the right mask image generation unit 236, a determination is made that the region of the vehicle is the moving subject, and the right short-time exposure mask image 314 in which the region of the vehicle has been masked is generated.

A right HDR image 322 (FIG. 13) is generated from the right long-time exposure mask image 312 and the right short-time exposure mask image 314 generated in this way. The right HDR image 322 is also an image in which the region of the vehicle has been masked.

Thus, because the region of the moving subject is masked and the masked image is used to generate the HDR image, the generated right HDR image 322 can be an image in which a ghost is not generated.

The reference distance image generation unit 239 generates the reference distance image 331 using the left HDR image 321 and the right HDR image 322. The reference distance image 331 is also an image in which the region of the vehicle determined to be the moving object has been masked (an image without a distance image of the region of the vehicle).

Because the reference distance image 331 is generated in this way, the reference distance image 331 can be distance information (distance image) that is not affected by a ghost, and can be an image in which distance measurement can be performed with high accuracy.

Because the reference distance image 331 is an image without distance information of the region of the moving subject, a process of generating the distance information of the region of the moving subject is executed.

Figure 11:
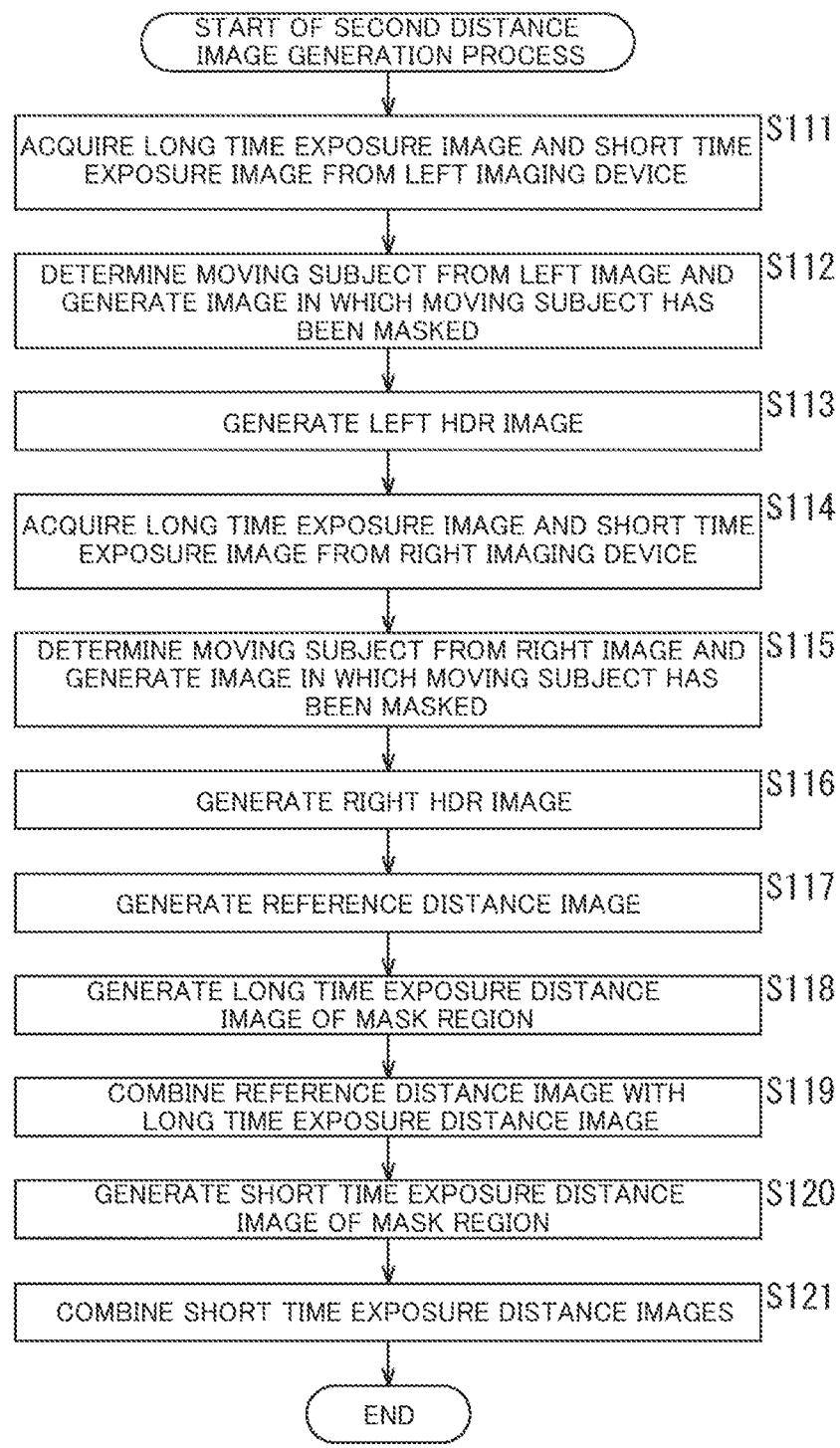
FIG. 11 is a flowchart illustrating an operation of the image processing apparatus.

Returning to the description with reference to the flow-chart of FIG. 11, when the reference distance image is generated in step S117, the process proceeds to step S118. In step S118, the long-time exposure distance image generation unit 240 performs generation of the distance image in the mask region using the long-time exposure image.

The long-time exposure distance image generation unit 240 generates the distance image of the masked region, in other words, the region determined to be the moving subject using the left long-time exposure image and the right long-time exposure image by using the left long-time exposure image from the left long-time exposure image input unit 231, the right long-time exposure image from the right long-time exposure image input unit 233, and the information on the masked region from the left mask image generation unit 235. Because both the left long-time exposure image and the right long-time exposure image are long-time exposure images, the distance image can be generated without generation of a ghost even in a region of the moving subject.

In step S119, the first distance image combination unit 242 combines the reference distance image from the reference distance image generation unit 239 with the long-time exposure distance image of the long-time exposure distance image generation unit 240. The distance image of the region corresponding to the masked region of the reference distance image is extracted from the long-time exposure distance image and combined with the reference distance image. The distance image after combination is supplied to the second distance image combination unit 243.

In the combination in the first distance image combination unit 242, when the distance information missing in the reference distance image can all be complemented with the long-time exposure distance image, the distance image after combination may be supplied to the distance image output unit 244 rather than the second distance image combination unit 243, and the processing after step S123 may not be performed.

In step S120, the short-time exposure distance image generation unit 241 performs generation of the distance image of the mask region using the short-time exposure image.

The short-time exposure distance image generation unit 241 generates the distance image of the masked region, in other words, the region determined to be the moving subject using the left short-time exposure image and the right short-time exposure image by using the left short-time exposure image from the left short-time exposure image input unit 232, the right short-time exposure image from the right short-time exposure image input unit 234, and the information on the masked region from the right mask image generation unit 236. Because both the left short-time exposure image and the right short-time exposure image are short-time exposure images, the distance image can be generated without generation of a ghost even in a region of the moving subject.

The second distance image combination unit 243 combines the distance image from the first distance image combination unit 242 with the short-time exposure distance image of the short-time exposure distance image generation unit 241. The distance image from the first distance image combination unit 242 is already a distance image generated from the long-time exposure image, and the distance image of the masked region is interpolated. Further, results of the short-time exposure distance image can be combined, as necessary. Further, the short-time exposure distance image or the long-time exposure distance image to be preferentially adopted can be selected according to use. The distance image after combination is supplied to the distance image output unit 244.

Thus, the distance image that is not affected by a ghost is generated.

The processing of steps S118 to S121 will be described again with reference to FIGS. 14 and 15.

Figure 14:
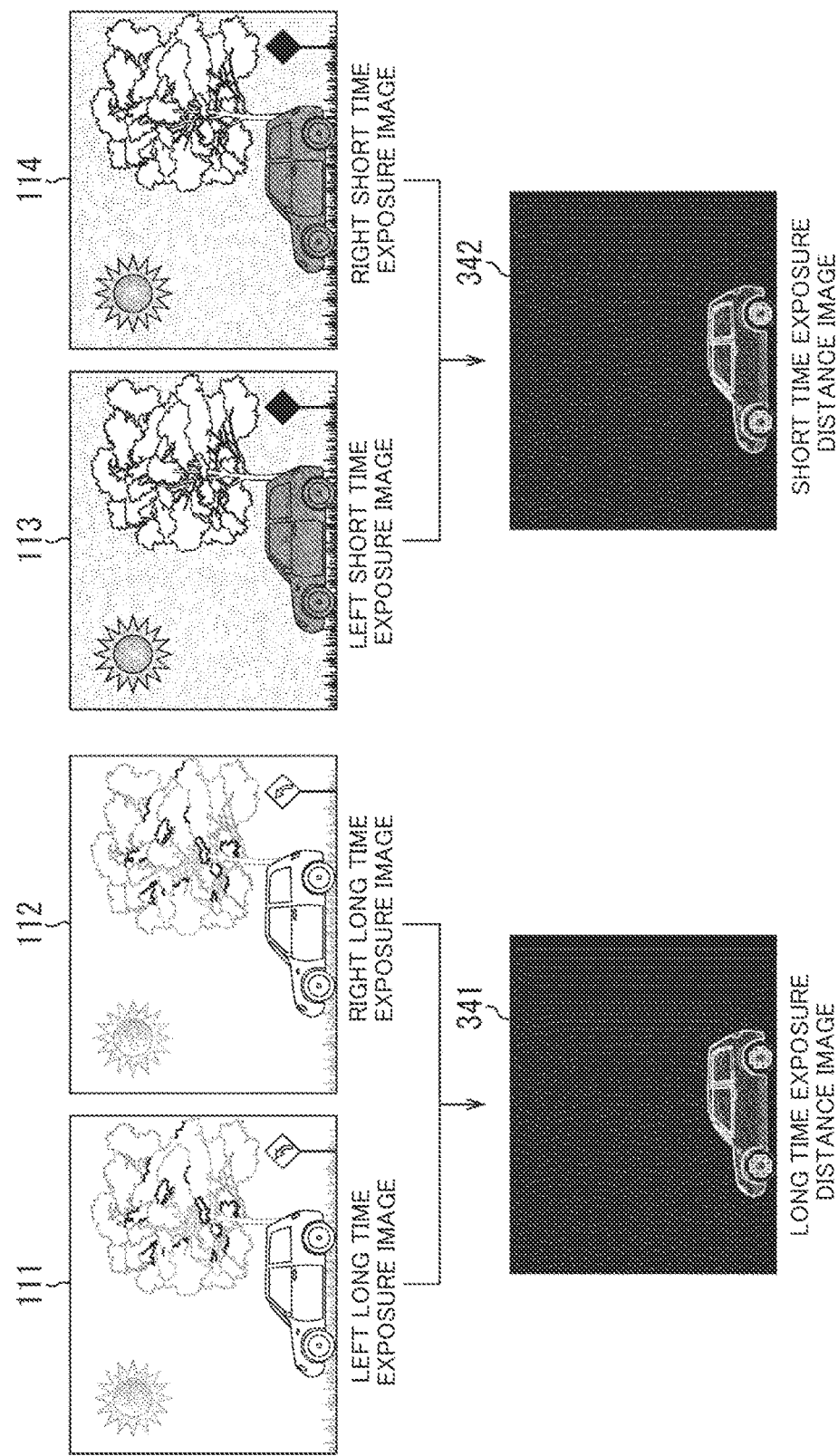
FIG. 14 is a diagram illustrating a way of generating a distance image.

As illustrated in FIG. 14, the long-time exposure distance image generation unit 240 generates a long-time exposure distance image 341 from the left long-time exposure image 111 and the right long-time exposure image 112. For the generated long-time exposure distance image 341, only the distance image of the region corresponding to the masked region is generated on the basis of information on the region masked as the region of the moving subject by the left mask image generation unit 235.

In this case, because the region of the vehicle is a masked region, the long-time exposure distance image 341 is the distance image of the region of the vehicle.

Similarly, the short-time exposure distance image generation unit 241 generates a short-time exposure distance image 342 from the left short-time exposure image 113 and the right short-time exposure image 114. For the generated short-time exposure distance image 342, only a distance image of the region corresponding to the masked region is generated on the basis of the information on the region masked as the region of the moving object by the right mask image generation unit 236.

In this case, because the region of the vehicle is the masked region, the short-time exposure distance image 342 is the distance image of the region of the vehicle.

Figure 15:
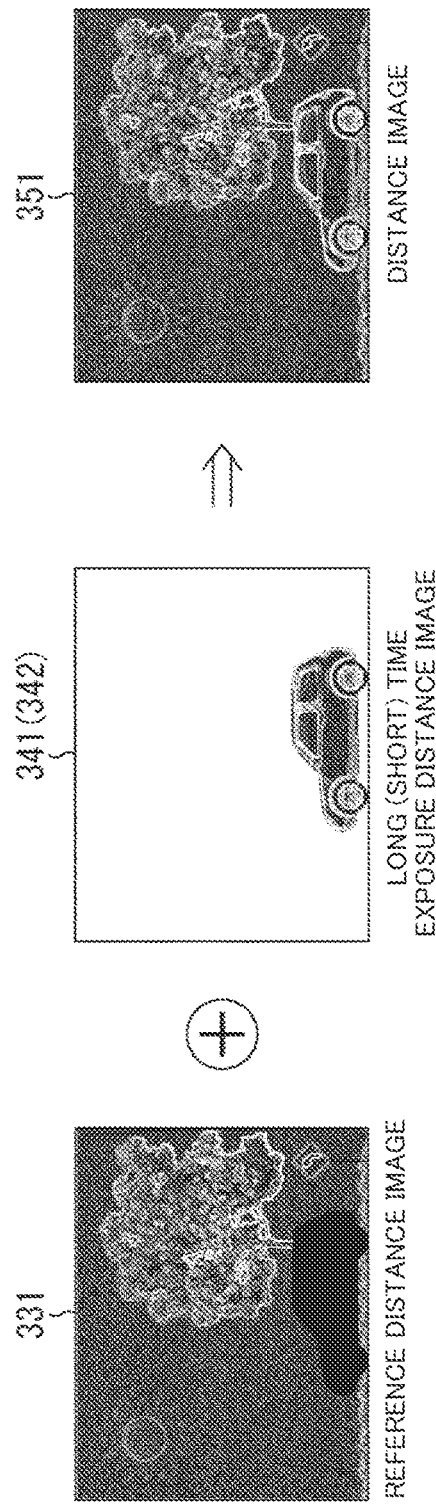
FIG. 15 is a diagram illustrating a way of generating a distance image.

As illustrated in FIG. 15, the reference distance image 331, the long-time exposure distance image 341, and the short-time exposure distance image 342 are combined through the processing of the first distance image combination unit 242 and the second distance image combination unit 243, so that a final distance image 351 is generated.

Thus, it is possible to generate the distance image 351 that is not affected by ghosts. Therefore, according to the present technology, it is possible to perform accurate distance measurement and generate the distance image.

Configuration and Operation of Image Processing Apparatus in Third Embodiment

A configuration and operation of an image processing apparatus in the third embodiment will be described. Because the image processing apparatus in the third embodiment can have the same configuration as the image processing apparatus 211 in the second embodiment illustrated in FIG. 10, description thereof will be omitted herein. Further, because the image processing apparatus 211 in the third embodiment basically performs the same operation as the image processing apparatus 211 in the second embodiment illustrated in FIG. 11, detailed description thereof will be omitted herein.

The image processing apparatus 211 (FIG. 10) of the third embodiment differs from the image processing apparatus 211 in the second embodiment in a way of masking when the left mask image generation unit 235 and the right mask image generation unit 236 generate the mask image.

In other words, the image processing apparatus 211 differs in a setting way of setting the region to be masked when the image processing apparatus 211 in the third embodiment executes the processing of step S112 or step S115.

The left mask image generation unit 235 and the right mask image generation unit 236 set the region to be masked on the basis of semantic segmentation. The semantic segmentation is processing of ascertaining an image at a pixel level and assigning each pixel in the image to an object such as a class of a person, a vehicle, a tree, or the sky.

For example, according to the semantic segmentation, when an image as illustrated in an upper part of FIG. 14 such as the left long-time exposure image 111 is analyzed, each pixel is associated with the sun, sky, tree, vehicle, ground, sign, and the like.

The semantic segmentation can be applied to the image processing apparatus 211 according to the embodiment. When the left mask image generation unit 235 and the right mask image generation unit 236 set the region to be masked through the semantic segmentation, an object likely to be a moving body such as a vehicle or a person is detected and, for example, the detected vehicle or person is set as the region to be masked, for example.

A stationary vehicle, person, or the like is also detected through the semantic segmentation. Because the vehicle, the person, or the like is a moving subject (an object likely to be a moving body), it is possible to detect the moving subject and mask such a region as in the second embodiment.

In the third embodiment, it is possible to also generate a distance image that is not affected by a ghost. Further, it is possible to perform accurate distance measurement and generate a distance image.

The image processing apparatus 12 (211) in the above-described embodiment can be mounted in a mobile device such as a vehicle, a drone, or a robot. Further, the imaging apparatus 11 are mounted on, for example, the front, rear, left side, and right side of the mobile device, and images from the mounted imaging apparatus 11 are processed by the image processing apparatus 12 (211) so that the distance between the predetermined object and the mobile device is measured.

Although a case in which the distance image is generated has been described in the above-described embodiment, the image may not be generated as the distance information. The present embodiment can be applied when the captured image is analyzed and a distance to the predetermined object is measured. Further, all captured images may not be set as measurement targets, and distance information in a predetermined region such as a region in which the predetermined object such as a vehicle or a person has been detected may be generated.

<Recording Medium>

The series of processes described above can be executed by hardware or can be executed by software. When the series of processes are executed by the software, a program constituting the software is installed in a computer. Here, examples of the computer include a computer embedded in dedicated hardware, and a general-purpose personal computer capable of executing various functions with various installed programs.

Figure 16:
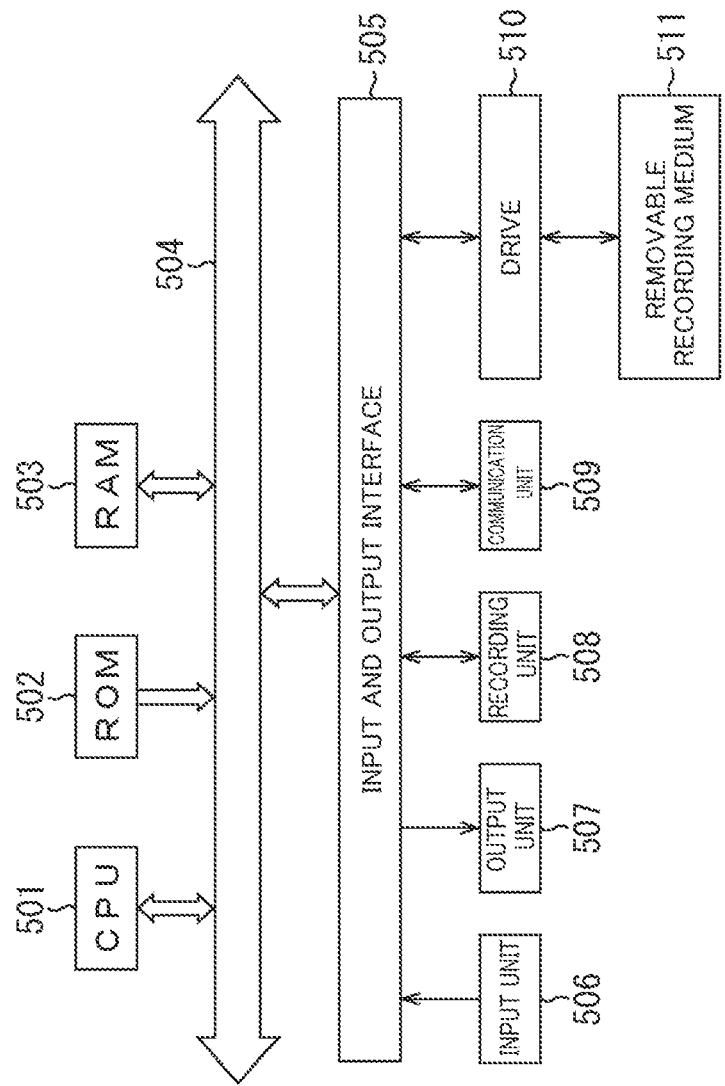
FIG. 16 is a diagram illustrating a recording medium.

FIG. 16 is a block diagram illustrating a configuration example of hardware of a computer that executes the above-described series of processes using a program. In the computer, a central processing unit (CPU) 501, a read only memory (ROM) 502, and a random access memory (RAM) 503 are connected to each other by a bus 504. An input and output interface 505 is further connected to the bus 504. An input unit 506, an output unit 507, a storage unit 508, a communication unit 509, and a drive 510 are connected to the input and output interface 505.

The input unit 506 includes a keyboard, a mouse, a microphone, and the like. The output unit 507 includes a display, a speaker, and the like. The storage unit 508 includes a hard disk, a non-volatile memory, and the like. The communication unit 509 includes a network interface and the like. The drive 510 drives a removable recording medium 511 such as a magnetic disk, an optical disc, a magneto-optical disc, or a semiconductor memory.

In the computer configured as described above, a CPU 501, for example, loads a program stored in the storage unit 508 into the RAM 503 via the input and output interface 505 and the bus 504 and executes the program, so that the series of processes described above are performed.

The program executed by the computer (CPU 501) can be recorded and provided on the removable recording medium 511 serving as a package recording medium or the like, for example. Further, the program can also be provided via a wired or wireless transmission medium such as a local area network, the Internet, or digital satellite broadcasting.

In the computer, the program can be installed in the storage unit 508 via the input and output interface 505 by the removable recording medium 511 being mounted in the drive 510. Further, the program can be received by the communication unit 509 via the wired or wireless transmission medium and installed in the storage unit 508. In addition, the program can be installed in the ROM 502 or the storage unit 508 in advance.

The program executed by the computer may be a program in which processing is performed in time series in order described in the present specification, or may be a program in which processing is performed in parallel or at a required timing such as a time when a call is performed.

Further, in the present specification, a system represents an entire apparatus including a plurality of apparatus.

The effects described in the present specification are merely examples, the present invention is not limited thereto, and other effects may be obtained.

The embodiments of the present technology are not limited to the above-described embodiments, and various changes can be made without departing from the gist of the present technology.

The present technology can also have the following configurations.

(1) An image processing apparatus including:
a long-time exposure distance image generation unit configured to capture an image with long-time exposure, calculate a parallax from a first long-time exposure image and a second long-time exposure image from a first long-time exposure camera and a second long-time exposure camera disposed at a predetermined interval, and generate a long-time exposure distance image;
a short-time exposure distance image generation unit configured to capture an image with short-time exposure, calculate a parallax from a first short-time exposure image and a second short-time exposure image from a first short-time exposure camera and a second short-time exposure camera disposed at a predetermined interval, and generate a short-time exposure distance image; and
a distance image generation unit configured to combine the long-time exposure distance image with the short-time exposure distance image to generate a distance image.

(2) The image processing apparatus according to (1), wherein
the image processing apparatus is configured to
generate a first long-time exposure mask image and a second long-time exposure mask image in which a predetermined region is masked for the first long-time exposure image and the second long-time exposure image,
generate a first short-time exposure mask image and a second short-time exposure mask image in which a predetermined region is masked for the first short-time exposure image and the second short-time exposure image,
calculate a parallax from the first long-time exposure mask image and the second long-time exposure mask image, and generate the long-time exposure distance image, and
calculate a parallax from the first short-time exposure mask image and the second short-time exposure mask image, and generat the short-time exposure distance image.
(3) The image processing apparatus according to (2), wherein
the first long-time exposure mask image and the second long-time exposure mask image are images in which pixels of which pixel values are larger than a predetermined threshold value are masked.
(4) The image processing apparatus according to (2) or (3), wherein
the first short-time exposure mask image and the second short-time exposure mask image are images in which pixels of which pixel values are smaller than a predetermined threshold value are masked.
(5) The image processing apparatus according to any one of (2) to (4), wherein
the distance image generation unit complements a masked region of the long-time exposure distance image with the short-time exposure distance image.
(6) An image processing method including: by an image processing apparatus, capturing an image with long-time exposure, calculating a parallax from a first long-time exposure image and a second long-time exposure image from a first long-time exposure camera and a second long-time exposure camera disposed at a predetermined interval; generating a long-time exposure distance image,
capturing an image with short-time exposure, calculating a parallax from a first short-time exposure image and a second short-time exposure image from a first short-time exposure camera and a second short-time exposure camera disposed at a predetermined interval;
generating a short-time exposure distance image; and
combining the long-time exposure distance image with the short-time exposure distance image to generate a distance image.
(7) A program for causing a computer to execute processing of
capturing an image with long-time exposure, calculating a parallax from a first long-time exposure image and a second long-time exposure image from a first long-time exposure camera and a second long-time exposure camera disposed at a predetermined interval, generating a long-time exposure distance image, capturing an image with short-time exposure, calculating a parallax from a first short-time exposure image and a second short-time exposure image from a first short-time exposure camera and a second short-time exposure camera disposed at a predetermined interval, generating a short-time exposure distance image; and
combining the long-time exposure distance image with the short-time exposure distance image to generate a distance image.

(8) A mobile device including:
a first long-time exposure camera and a second long-time exposure camera configured to capture an image with long-time exposure and disposed at a predetermined interval;
a first short-time exposure camera and a second short-time exposure camera configured to capture an image with short-time exposure and disposed at a predetermined interval;
a long-time exposure distance image generation unit configured to calculate a parallax from a first long-time exposure image from the first long-time exposure camera and a second long-time exposure image from the second long-time exposure camera and generate a long-time exposure distance image;
a short-time exposure distance image generation unit configured to calculate a parallax from a first short-time exposure image from the first short-time exposure camera and a second short-time exposure image from the second short-time exposure camera and generate a short-time exposure distance image; and
a distance image generation unit configured to combine the long-time exposure distance image with the short-time exposure distance image to generate a distance image.
(9) An image processing apparatus including:
a first image generation unit configured to combine a first long-time exposure image from a first long-time exposure camera that captures an image with long-time exposure with a first short-time exposure image from a first short-time exposure camera that captures an image with short-time exposure to generate a first image with a wide dynamic range;
a second image generation unit configured to combine a second long-time exposure image from a second long-time exposure camera disposed at a position separated a predetermined distance from the first long-time exposure camera and capturing an image with long-time exposure with a second short-time exposure image from a second short-time exposure camera disposed at a position separated a predetermined distance from the first short-time exposure camera and capturing an image with short-time exposure to generate a second image with a wide dynamic range;
a reference distance image generation unit configured to calculate a parallax from the first image and the second image to generate a reference distance image serving as a reference;
a long-time exposure distance image generation unit configured to calculate a parallax from the first long-time exposure image and the second long-time exposure image to generate a long-time exposure distance image; and a distance image generation unit configured to combine the reference distance image with the long-time exposure distance image to generate a distance image.
(10) The image processing apparatus according to (9), wherein the image processing apparatus is configured to
generate a first long-time exposure mask image and a first short-time exposure mask image in which a predetermined region is masked for the first long-time exposure image and the first short-time exposure image,
generate a second long-time exposure mask image and a second short-time exposure mask image in which a predetermined region is masked for the second long-time exposure image and the second short-time exposure image,
combines the first long-time exposure mask image with the first short-time exposure mask image to generate the first image with a wide dynamic range,
combine the second long-time exposure mask image with the second short-time exposure mask image to generate the second image with a wide dynamic range, and calculate a parallax from the first long-time exposure mask image and the second long-time exposure mask image, and generate the long-time exposure distance image.

(11) The image processing apparatus according to (10), wherein the first long-time exposure mask image and the first short-time exposure mask image are images in which a region determined to be a moving subject in the image is masked.

(12) The image processing apparatus according to (10), wherein the first long-time exposure mask image and the first short-time exposure mask image are images in which a predetermined object is detected through semantic segmentation and a region detected as the predetermined object is masked.

(13) The image processing apparatus according to any one of (10) to (12), wherein the distance image generation unit complements the masked region of the reference distance image with the long-time exposure distance image.

(14) The image processing apparatus according to any one of (10) to (13), further including: a short-time exposure distance image generation unit configured to calculate a parallax from the first short-time exposure mask image and the second short-time exposure mask image to generate a short-time exposure distance image; and a combination unit to configured to combine the distance image generated by the distance image generation unit with the short-time exposure distance image.

(15) An image processing method including: by an image processing apparatus, combining a first long-time exposure image from a first long-time exposure camera that captures an image with long-time exposure with a first short-time exposure image from a first short-time exposure camera that captures an image with short-time exposure to generate a first image with a wide dynamic range; combining a second long-time exposure image from a second long-time exposure camera disposed at a position separated a predetermined distance from the first long-time exposure camera and capturing an image with long-time exposure with a second short-time exposure image from a second short-time exposure camera disposed at a position separated a predetermined distance from the first short-time exposure camera and capturing an image with short-time exposure to generate a second image with a wide dynamic range; calculating a parallax from the first image and the second image to generate a reference distance image serving as a reference; calculating a parallax from the first long-time exposure image and the second long-time exposure image to generate a long-time exposure distance image; and combining the reference distance image with the long-time exposure distance image to generate a distance image.

(16) A program for causing a computer to execute processing of combining a first long-time exposure image from a first long-time exposure camera that captures an image with long-time exposure with a first short-time exposure image from a first short-time exposure camera that captures an image with short-time exposure to generate a first image with a wide dynamic range, combining a second long-time exposure image from a second long-time exposure camera disposed at a position separated a predetermined distance from the first long-time exposure camera and capturing an image with long-time exposure with a second short-time exposure image from a second short-time exposure camera disposed at a position separated a predetermined distance from the first short-time exposure camera and capturing an image with short-time exposure to generate a second image with a wide dynamic range, calculating a parallax from the first image and the second image to generate a reference distance image serving as a reference, calculating a parallax from the first long-time exposure image and the second long-time exposure image to generate a long-time exposure distance image, and combining the reference distance image with the long-time exposure distance image to generate a distance image.

(17) A mobile device including: a first long-time exposure camera and a second long-time exposure camera configured to capture an image with long-time exposure and disposed at a predetermined interval; a first short-time exposure camera and a second short-time exposure camera configured to capture an image with short-time exposure and disposed at a predetermined interval; a first image generation unit configured to combine a first long-time exposure image from the first long-time exposure camera with a first short-time exposure image from the first short-time exposure camera to generate a first image with a wide dynamic range; a second image generation unit configured to combine a second long-time exposure image from the second long-time exposure camera with a second short-time exposure image from the second short-time exposure camera to generate a second image with a wide dynamic range; a reference distance image generation unit configured to calculate a parallax from the first image and the second image to generate a reference distance image serving as a reference; a long-time exposure distance image generation unit configured to calculate a parallax from the first long-time exposure image and the second long-time exposure image to generate a long-time exposure distance image; and a distance image generation unit configured to combine the reference distance image with the long-time exposure distance image to generate a distance image.

REFERENCE SIGNS LIST

11 Imaging apparatus
12 Image processing apparatus
21 Long-time exposure camera
22 Short-time exposure camera
23 Medium-time exposure camera
31 Long-time exposure image input unit
32 Short-time exposure image input unit
33 Long-time exposure mask image generation unit
34 Short-time exposure mask image generation unit
35 Long-time exposure distance image generation unit
36 Short-time exposure distance image generation unit
37 Combined image generation unit
38 Distance image output unit
111 Left long-time exposure image
112 Right long-time exposure image
113 Left short-time exposure image
114 Right short-time exposure image
121 Left long-time exposure mask image
122 Right long-time exposure mask image
123 Left short-time exposure mask image
124 Right short-time exposure mask Image
131 Long-time exposure distance image
132 Short-time exposure distance image
141 Distance image
211 Image processing apparatus
231 Left long-time exposure image input unit
232 Left short-time exposure image input unit
233 Right long-time exposure image input Unit 234 Right short-time exposure image input unit
235 Left mask image generation unit
236 Right mask image generation unit
237 Left HDR generation unit
238 Right HDR generation unit
239 Reference distance image generation unit
240 Long-time exposure distance image Generation unit
241 Short-time exposure distance image generation unit
242 First distance image combination unit
243 Second distance image combination unit
244 Distance image output unit
311 Left long-time exposure mask image
312 Right long-time exposure mask Image
313 Left short-time exposure mask image
314 Right short-time exposure mask image
321 Left HDR image
322 Right HDR image
331 Reference distance image
341 Long-time exposure distance image
342 Short-time exposure distance image
351 Distance image

The invention claimed is:

1. An image processing apparatus, comprising:
a central processing unit (CPU) configured to:
  receive a first long-time exposure image from a first long-time exposure camera that captures the first long-time exposure image with long-time exposure;
  receive a second long-time exposure image from a second long-time exposure camera that captures the second long-time exposure image with the long-time exposure, wherein the second long-time exposure camera is at a first distance from the first long-time exposure camera;
  generate, based on the first long-time exposure image, a first long-time exposure mask image in which a first region is masked;
  generate, based on the second long-time exposure image, a second long-time exposure mask image in which the first region is masked;
  calculate a first parallax for a second region of each of the first long-time exposure mask image and the second long-time exposure mask image, wherein the second region is different from the first region that is masked;
  generate a long-time exposure distance image based on the first parallax;
  receive a first short-time exposure image from a first short-time exposure camera that captures the first short-time exposure image with short-time exposure, wherein a time period of the long-time exposure is longer than a time period of the short-time exposure;
  receive a second short-time exposure image from a second short-time exposure camera that captures the second short-time exposure image with the short-time exposure, wherein the second short-time exposure camera is at a second distance from the first short-time exposure camera;
  generate, based on the first short-time exposure image, a first short-time exposure mask image in which the second region is masked;
  generate, based on the second short-time exposure image, a second short-time exposure mask image in which the second region is masked;
  calculate a second parallax for the first region of each of the first short-time exposure mask image and the second short-time exposure mask image;
  generate a short-time exposure distance image based on the second parallax; and
  combine the long-time exposure distance image with the short-time exposure distance image to generate a distance image.

2. The image processing apparatus according to claim 1, wherein the CPU is further configured to generate each of the first long-time exposure mask image and the second long-time exposure mask image in which a plurality of pixels having a plurality of pixel values larger than a first threshold value is masked.

3. The image processing apparatus according to claim 1, wherein the CPU is further configured to generate each of the first short-time exposure mask image and the second short-time exposure mask image in which a plurality of pixels having a plurality of pixel values smaller than a second threshold value is masked.

4. The image processing apparatus according to claim 1, wherein the CPU is further configured to complement a masked region of the long-time exposure distance image with the short-time exposure distance image.

5. An image processing method, comprising:
  receiving a first long-time exposure image from a first long-time exposure camera that captures the first long-time exposure image with long-time exposure;
  receiving second long-time exposure image from a second long-time exposure camera that captures the second long-time exposure image with the long-time exposure, wherein the second long-time exposure camera is at a first distance from the first long-time exposure camera;
  generating, based on the first long-time exposure image, a first long-time exposure mask image in which a first region is masked;
  generating, based on the second long-time exposure image, a second long-time exposure mask image in which the first region is masked;
  calculating a first parallax for a second region of each of the first long-time exposure mask image and the second long-time exposure mask image, wherein the second region is different from the first region that is masked;
  generating a long-time exposure distance image based on the first parallax;
  receiving a first short-time exposure image from a first short-time exposure camera that captures the first short-time exposure image with short-time exposure, wherein a time period of the long-time exposure is longer than a time period of the short-time exposure;
  receiving a second short-time exposure image from a second short-time exposure camera that captures the second short-time exposure image with the short-time exposure, wherein the second short-time exposure camera is at a second distance from the first short-time exposure camera;
  generating, based on the first short-time exposure image, a first short-time exposure mask image in which the second region is masked;
  generating, based on the second short-time exposure image, a second short-time exposure mask image in which the second region is masked;
  calculating a second parallax for the first region of each of the first short-time exposure mask image and the second short-time exposure mask image;
  generating a short-time exposure distance image based on the second parallax; and
  combining the long-time exposure distance image with the short-time exposure distance image to generate a distance image.

6. A non-transitory computer-readable medium having stored thereon, computer-executable instructions which, when executed by a computer, cause the computer to execute operations, the operations comprising:
- receiving a first long-time exposure image from a first long-time exposure camera that captures the first long-time exposure image with long-time exposure;
- receiving a second long-time exposure image from a second long-time exposure camera that captures the second long-time exposure image with the long-time exposure, wherein the second long-time exposure camera is at a first distance from the first long-time exposure camera;
- generating, based on the first long-time exposure image, a first long-time exposure mask image in which a first region is masked;
- generating, based on the second long-time exposure image, a second long-time exposure mask image in which the first region is masked;
- calculating a first parallax for a second region of each of the first long-time exposure mask image and the second long-time exposure mask image, wherein the second region is different from the first region that is masked;
- generating a long-time exposure distance image based on the first parallax;
- receiving a first short-time exposure image from a first short-time exposure camera that captures the first short-time exposure image with short-time exposure, wherein a time period of the long-time exposure is longer than a time period of the short-time exposure;
- receiving second short-time exposure image from a second short-time exposure camera that captures the second short-time exposure image with the short-time exposure, wherein the second short-time exposure camera is at a second distance from the first short-time exposure camera;
- generating, based on the first short-time exposure image, a first short-time exposure mask image in which the second region is masked;
- generating, based on the second short-time exposure image, a second short-time exposure mask image in which the second region is masked;
- calculating a second parallax for the first region of each of the first short-time exposure mask image and the second short-time exposure mask image;
- generating a short-time exposure distance image based on the second parallax; and
- combining the long-time exposure distance image with the short-time exposure distance image to generate a distance image.

7. A mobile device, comprising:
- a first long-time exposure camera configured to capture a first long-time exposure image with long-time exposure;
- a second long-time exposure camera configured to capture a second long-time exposure image with the long-time exposure, wherein the second long-time exposure camera is at a first distance from the first long-time exposure camera;
- a first short-time exposure camera configured to capture a first short-time exposure image with short-time exposure, wherein a time period of the long-time exposure is longer than a time period of the short-time exposure;
- a second short-time exposure camera configured to capture a second short-time exposure image with the short-time exposure, wherein the second short-time exposure camera is at a second distance from the first short-time exposure camera; and
- a central processing unit (CPU) configured to:
  - receive the first long-time exposure image from the first long-time exposure camera and the second long-time exposure image from the second long-time exposure camera;
  - generate, based on the first long-time exposure image, a first long-time exposure mask image in which a first region is masked;
  - generate, based on the second long-time exposure image, a second long-time exposure mask image in which the first region is masked;
  - calculate a first parallax for a second region of each of the first long-time exposure mask image and the second long-time exposure mask image, wherein the second region is different from the first region that is masked;
  - generate a long-time exposure distance image based on the first parallax;
  - receive the first short-time exposure image from the first short-time exposure camera and the second short-time exposure image from the second short-time exposure camera;
  - generate, based on the first short-time exposure image, a first short-time exposure mask image in which the second region is masked;
  - generate, based on the second short-time exposure image, a second short-time exposure mask image in which the second region is masked;
  - calculate a second parallax for the first region of each of the first short-time exposure mask image and the second short-time exposure mask image;
  - generate a short-time exposure distance image based on the second parallax; and
  - combine the long-time exposure distance image with the short-time exposure distance image to generate a distance image.

8. An image processing apparatus, comprising:
a central processing unit (CPU) configured to:
- receive a first long-time exposure image from a first long-time exposure camera that captures the first long-time exposure image with long-time exposure;
- receive a first short-time exposure image from a first short-time exposure camera that captures the first short-time exposure image with short-time exposure, wherein a time period of the long-time exposure is longer than a time period of the short-time exposure;
- combine the first long-time exposure image with the first short-time exposure image to generate a first image with a wide dynamic range;
- receive a second long-time exposure image from a second long-time exposure camera that is at a position separated by a first distance from the first long-time exposure camera, wherein the second long-time exposure camera captures the second long-time exposure image with the long-time exposure;
- receive a second short-time exposure image from a second short-time exposure camera that is at a position separated by a second distance from the first short-time exposure camera, wherein the second short-time exposure camera captures the second short-time exposure image with the short-time exposure;

combine the second long-time exposure image with the second short-time exposure image to generate a second image with the wide dynamic range;
calculate a first parallax from the first image and the second image to generate a reference distance image that serves as a reference;
calculate a second parallax from the first long-time exposure image and the second long-time exposure image to generate a long-time exposure distance image; and
combine the reference distance image with the long-time exposure distance image to generate a distance image.

9. The image processing apparatus according to claim 8, wherein the CPU is further configured to:
generate, based on the first long-time exposure image, a first long-time exposure mask image in which a specific region is masked;
generate, based on the first short-time exposure image, a first short-time exposure mask image in which the specific region is masked;
generate, based on the second long-time exposure image, a second long-time exposure mask image in which the specific region is masked;
generate, based on the second short-time exposure image, a second short-time exposure mask image in which the specific region is masked;
combine the first long-time exposure mask image with the first short-time exposure mask image to generate the first image with the wide dynamic range;
combine the second long-time exposure mask image with the second short-time exposure mask image to generate the second image with the wide dynamic range; and
calculate a third parallax from the first long-time exposure mask image and the second long-time exposure mask image; and
generate the long-time exposure distance image based on the third parallax.

10. The image processing apparatus according to claim 9, wherein the CPU is further configured to:
determine a moving subject in each of the first long-time exposure image and the first short-time exposure image; and
generate each of the first long-time exposure mask image and the first short-time exposure mask image in which a region of the moving subject is masked.

11. The image processing apparatus according to claim 9, wherein the CPU is further configured to:
detect, based on semantic segmentation, a specific object in each of the first long-time exposure image and the first short-time exposure image; and
generate each of the first long-time exposure mask image and the first short-time exposure mask image in which a region of the specific object is masked.

12. The image processing apparatus according to claim 9, wherein the CPU is further configured to complement a masked region of the reference distance image with the long-time exposure distance image.

13. The image processing apparatus according to claim 9, wherein the CPU is further configured to:
calculate a fourth parallax from the first short-time exposure mask image and the second short-time exposure mask image to generate a short-time exposure distance image; and
combine the generated distance image with the short-time exposure distance image.

14. An image processing method, comprising:
receiving a first long-time exposure image from a first long-time exposure camera that captures the first long-time exposure image with long-time exposure;
receiving a first short-time exposure image from a first short-time exposure camera that captures the first short-time exposure image with short-time exposure, wherein a time period of the long-time exposure is longer than a time period of the short-time exposure;
combining the first long-time exposure image with the first short-time exposure image for generating a first image with a wide dynamic range;
receiving a second long-time exposure image from a second long-time exposure camera that is at a position separated by a first distance from the first long-time exposure camera, wherein the second long-time exposure camera captures the second long-time exposure image with the long-time exposure;
receiving a second short-time exposure image from a second short-time exposure camera that is at a position separated by a second distance from the first short-time exposure camera, wherein the second short-time exposure camera captures the second short-time exposure image with the short-time exposure;
combining the second long-time exposure image with the second short-time exposure image for generating a second image with the wide dynamic range;
calculating a first parallax from the first image and the second image to generate a reference distance image serving as a reference;
calculating a second parallax from the first long-time exposure image and the second long-time exposure image to generate a long-time exposure distance image; and
combining the reference distance image with the long-time exposure distance image to generate a distance image.

15. A non-transitory computer-readable medium having stored thereon, computer-executable instructions which, when executed by a computer, cause the computer to execute operations, the operations comprising:
receiving a first long-time exposure image from a first long-time exposure camera that captures the first long-time exposure image with long-time exposure;
receiving a first short-time exposure image from a first short-time exposure camera that captures the first short-time exposure image with short-time exposure, wherein a time period of the long-time exposure is longer than a time period of the short-time exposure;
combining the first long-time exposure image with the first short-time exposure image for generating a first image with a wide dynamic range;
receiving a second long-time exposure image from a second long-time exposure camera that is at a position separated by a first distance from the first long-time exposure camera, wherein the second long-time exposure camera captures the second long-time exposure image with the long-time exposure;
receiving a second short-time exposure image from a second short-time exposure camera that is at a position separated by a second distance from the first short-time exposure camera, wherein the second short-time exposure camera captures the second short-time exposure image with the short-time exposure;
combining the second long-time exposure image with the second short-time exposure image for generating a second image with the wide dynamic range;

calculating a first parallax from the first image and the second image to generate a reference distance image serving as a reference;

calculating a second parallax from the first long-time exposure image and the second long-time exposure image to generate a long-time exposure distance image; and combining the reference distance image with the long-time exposure distance image to generate a distance image.

16. A mobile device, comprising:

a first long-time exposure camera configured to capture a first long-time exposure image with long-time exposure;

a second long-time exposure camera configured to capture a second long-time exposure image with the long-time exposure, wherein the second long-time exposure camera is at a first distance from the first long-time exposure camera;

a first short-time exposure camera configured to capture a first short-time exposure image with short-time exposure, wherein a time period of the long-time exposure is longer than a time period of the short-time exposure;

a second short-time exposure camera configured to capture a second short-time exposure image with the short-time exposure, wherein the second short-time exposure camera is at a second distance from the first short-time exposure camera; and a central processing unit (CPU) configured to:

receive the first long-time exposure image from the first long-time exposure camera and the first short-time exposure image from the first short-time exposure camera;

combine the first long-time exposure image with the first short-time exposure image to generate a first image with a wide dynamic range;

receive the second long-time exposure image from the second long-time exposure camera and the second short-time exposure image from the second short-time exposure camera;

combine the second long-time exposure image with the second short-time exposure image to generate a second image with the wide dynamic range;

calculate a first parallax from the first image and the second image to generate a reference distance image that serves as a reference;

calculate a second parallax from the first long-time exposure image and the second long-time exposure image to generate a long-time exposure distance image; and combine the reference distance image with the long-time exposure distance image to generate a distance image.

* * * * *